(12) United States Patent
Chuang

(10) Patent No.: US 10,034,146 B2
(45) Date of Patent: Jul. 24, 2018

(54) CONTROL SYSTEM, CONTROL DEVICE, AND MOBILE DEVICE FOR VEHICLE

(71) Applicant: Yu-Nien Chen, New Taipei (TW)

(72) Inventor: Hsun-Hsin Chuang, New Taipei (TW)

(73) Assignee: Yu-Nien Chen, New Taipei (TW)

( * ) Notice: Subject to any disclaimer, the term of this patent is extended or adjusted under 35 U.S.C. 154(b) by 106 days.

(21) Appl. No.: 15/226,927

(22) Filed: Aug. 3, 2016

(65) Prior Publication Data

US 2017/0048680 A1 Feb. 16, 2017

Related U.S. Application Data

(60) Provisional application No. 62/204,993, filed on Aug. 14, 2015.

(30) Foreign Application Priority Data

Nov. 30, 2015 (TW) .............................. 104139846 A
Mar. 31, 2016 (TW) .............................. 105110228 A

(51) Int. Cl.
*H04W 24/00* (2009.01)
*H04W 4/04* (2009.01)
(Continued)

(52) U.S. Cl.
CPC ............ *H04W 4/046* (2013.01); *G08C 17/02* (2013.01); *H04W 4/80* (2018.02); *H04W 76/10* (2018.02)

(58) Field of Classification Search
CPC ..... H04W 4/046; H04W 76/02; H04W 4/008; G08C 17/02
(Continued)

(56) References Cited

U.S. PATENT DOCUMENTS 7,907,903 B2 3/2011 Shen
8,947,530 B1 2/2015 Scalisi
(Continued)

FOREIGN PATENT DOCUMENTS

CN 102457533 5/2012
TW 201506665 2/2015
(Continued)

OTHER PUBLICATIONS

"Office Action of Taiwan Counterpart Application," dated Mar. 27, 2017, p. 1-p. 6.

*Primary Examiner* — Marcos Batista
(74) *Attorney, Agent, or Firm* — JCIPRNET

(57) ABSTRACT

A control system a control device, and a mobile device for controlling a vehicle are provided. The control device is adapted to be disposed on a vehicle. The mobile device is configured to establish a connection with the control device via a bluetooth transmission interface. When the connection is established, the control device and the mobile device perform an audio verification means (or optionally also perform a bluetooth verification means) such that the control device performs verification on the mobile device via the transmission of an audio signal (or optionally also via the transmission of a bluetooth signal) and accordingly detects the relative position between the mobile device and the vehicle. In particular, when the mobile device is verified, the control device performs a control function on the vehicle according to the operating state of the vehicle and the relative position between the mobile device and the vehicle.

15 Claims, 13 Drawing Sheets

(51) Int. Cl.
*G08C 17/02* (2006.01)
*H04W 76/10* (2018.01)
*H04W 4/80* (2018.01)

(58) Field of Classification Search
USPC .............................. 455/45.1–456.3; 370/338
See application file for complete search history.

(56) References Cited

U.S. PATENT DOCUMENTS

2014/0045556 A1* 2/2014 Subramanian .... H04W 52/0251
455/574
2015/0235486 A1* 8/2015 Ellis ................... G07C 9/00309
340/5.61

FOREIGN PATENT DOCUMENTS

TW 201527152 7/2015
TW M415952 11/2015

\* cited by examiner

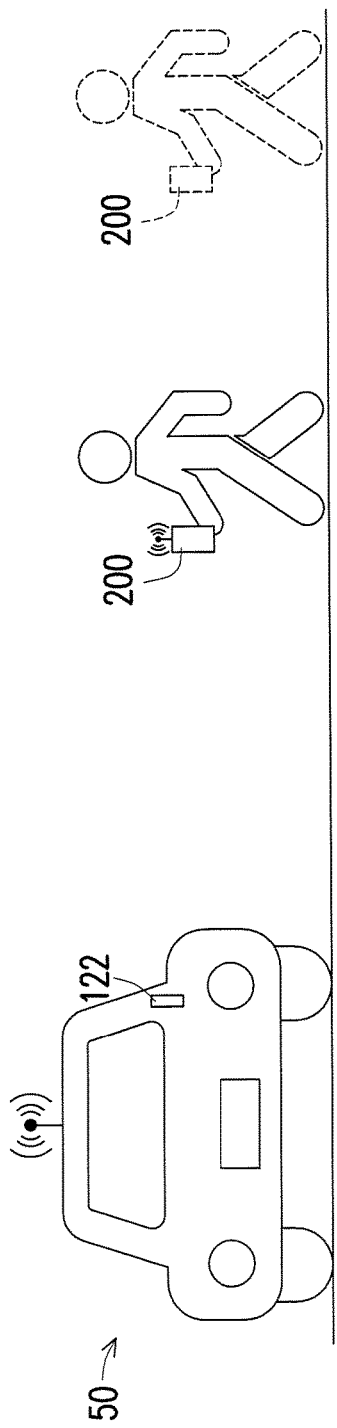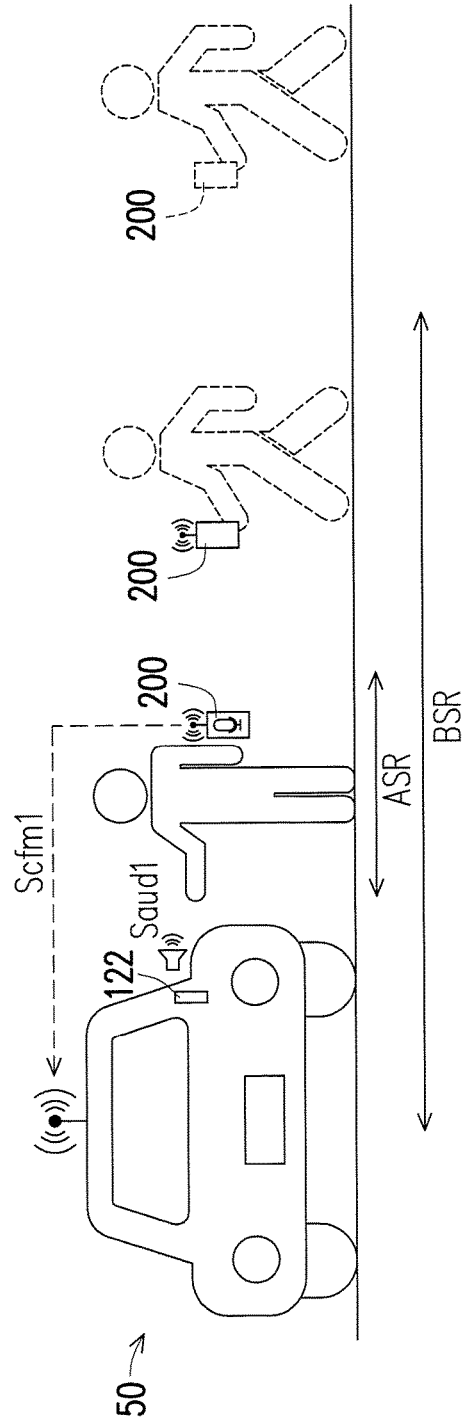

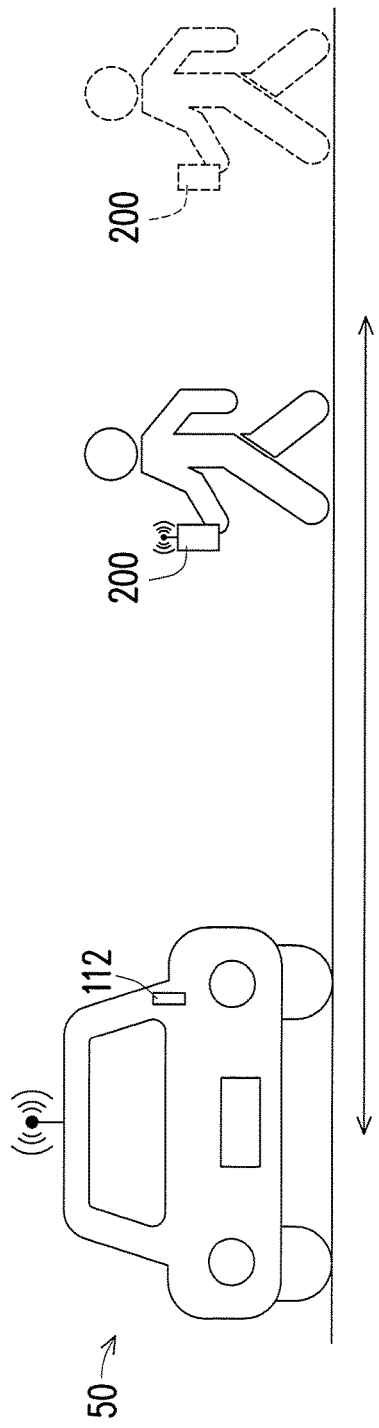
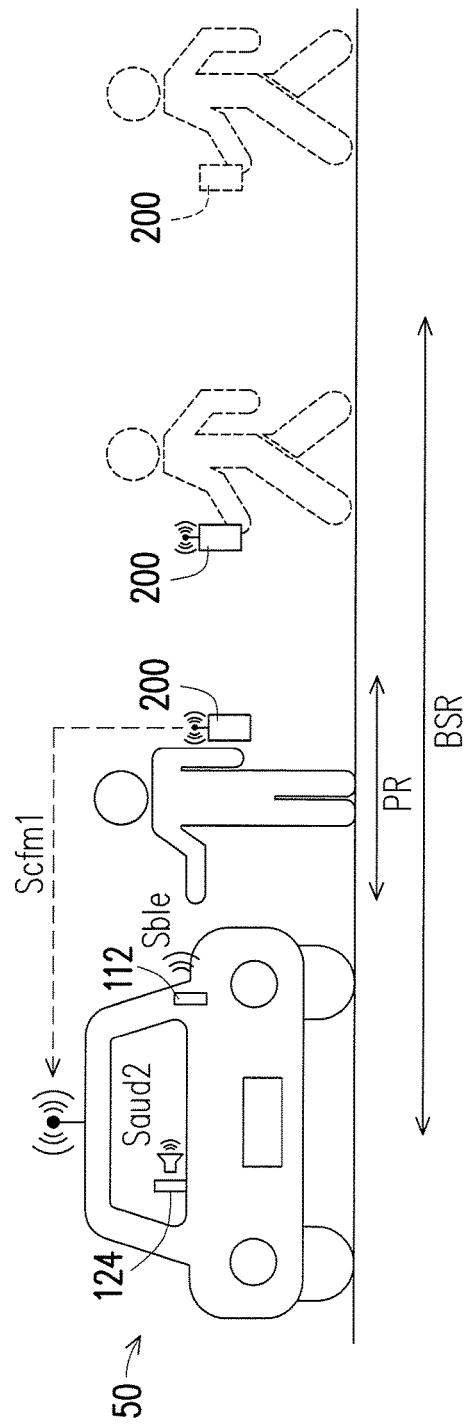

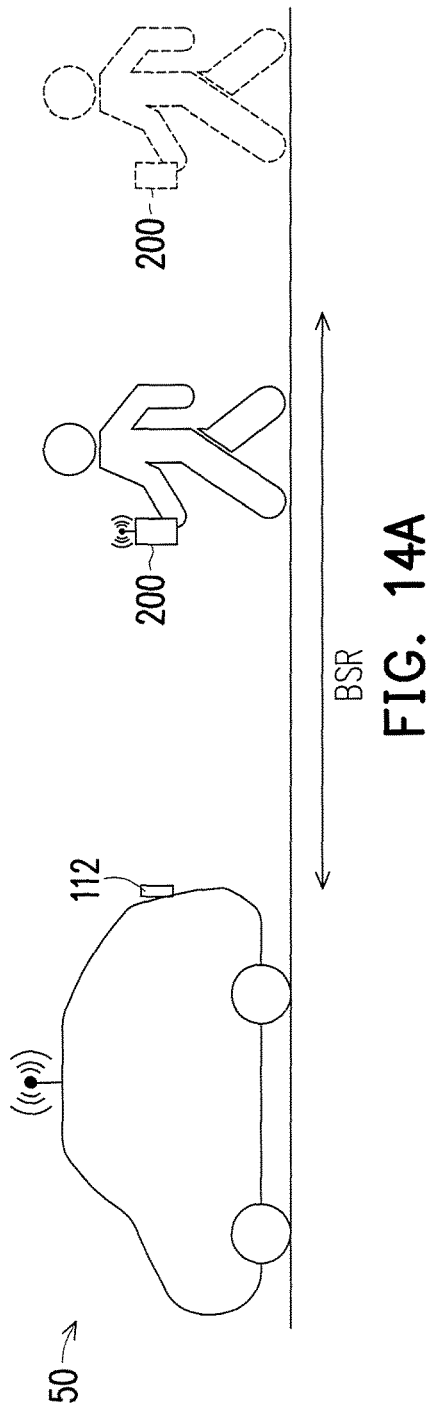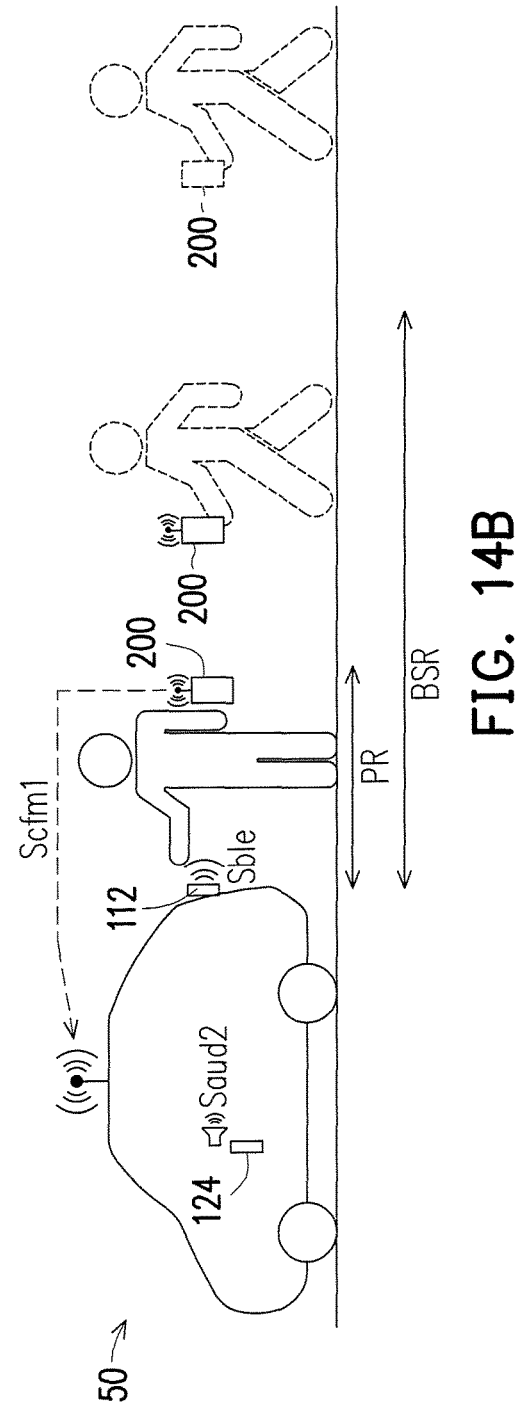

CONTROL SYSTEM, CONTROL DEVICE, AND MOBILE DEVICE FOR VEHICLE

CROSS-REFERENCE TO RELATED APPLICATION

This application claims the priority benefits of U.S. provisional application Ser. No. 62/204,993, filed on Aug. 14, 2015, Taiwan application serial no. 104139846, filed on Nov. 30, 2015, and Taiwan application serial no. 105110228, filed on Mar. 31, 2016. The entirety of each of the above-mentioned patent applications is hereby incorporated by reference herein and made a part of this specification.

BACKGROUND OF THE INVENTION

Field of the Invention

The invention relates to a control system and an application thereof, and more particularly, to a control system, a control device of a vehicle, and a mobile device.

Description of Related Art

Among the currently available anti-theft car key systems, the most advanced one is passive keyless entry (PKE) allowing the owner to complete actions such as unlocking the doors and starting the engine without touching the key. That is, when the owner approaches the car, the car automatically detects the key carried by the owner and performs identity verification. When identity verification is complete, the car is automatically unlocked, which allows the owner to enter the car. When the owner enters the car, the car also automatically determines whether the car key is in the car. If the car key is in the car, then the owner only needs to press the engine start button to start the engine. However, microwave signals of a low frequency such as 125 kHz and a high frequency such as 433 MHz for key position detection and identity verification are utilized in the PKE system. However, such frequency bands are not microwave signal frequency bands used in a general mobile device, and therefore a specific remote sensor controller provided with a wireless signal transceiver module operating in the above frequency bands is needed as the car key. For the user, the said specific remote sensor controller still needs to be carried, thus adding to the burden of the owner.

SUMMARY OF THE INVENTION

The invention provides a control system, a control device of a vehicle and a mobile device capable of solving the issues of prior art.

The control system of the invention includes a control device and a mobile device. The control device is adapted to be disposed on a vehicle. The mobile device is configured to establish a connection with the control device via a bluetooth transmission interface. When the connection is established, the control device and the mobile device perform an audio verification means such that the control device performs verification on the mobile device via the transmission of an audio signal and accordingly detects the relative position between the mobile device and the vehicle. In particular, when the mobile device is verified, the control device performs a control function on the vehicle according to the operating state of the vehicle and the relative position between the mobile device and the vehicle.

The control device of the invention is adapted to be disposed on a vehicle. The control device includes a bluetooth module, an audio transceiver module, and a control unit. The bluetooth module is configured to provide a bluetooth transmission interface. The audio transceiver module is controlled to transmit or receive an audio signal. The control unit is electrically connected to the bluetooth module and the audio transceiver module to control the operations of the bluetooth module and the audio transceiver module. When the bluetooth module establishes a connection, the control unit performs an audio verification means, so as to perform verification on the mobile device for which a connection is established with the bluetooth module via the transmission of an audio signal, and accordingly detects the relative position between the mobile device and the vehicle. When the mobile device is verified, the control unit performs a control function on the vehicle according to the operating state of the vehicle and the relative position between the mobile device and the vehicle.

The control system of the invention includes a control device and a mobile device. The control device is adapted to be disposed on a vehicle, wherein the control device includes a first bluetooth module, a second bluetooth module, and an audio transceiver module. The mobile device is configured to establish a connection with the control device via a bluetooth transmission interface provided by the first bluetooth module. When the connection is established, the control device and the mobile device perform a bluetooth verification means and an audio verification means such that the control device performs verification on the mobile device via the second bluetooth module and the audio transceiver module using the transmission of the bluetooth signal and the transmission of the audio signal, and accordingly detect the relative position between the mobile device and the vehicle. When the mobile device is verified, the control device performs a control function on the vehicle according to the operating state of the vehicle and the relative position between the mobile device and the vehicle.

The control device of the invention is adapted to be disposed on a vehicle. The control device includes a first bluetooth module, a second bluetooth module, an audio transceiver module, and a control unit. The first bluetooth module is configured to provide a bluetooth transmission interface. The second bluetooth module is configured to transmit or receive a bluetooth signal. The audio transceiver module is configured to transmit or receive an audio signal. The control unit is electrically connected to the first bluetooth module, the second bluetooth module, and the audio transceiver module to control the operations of the first bluetooth module, the second bluetooth module, and the audio transceiver module. When the first bluetooth module establishes a connection, the control unit performs a bluetooth verification means and an audio verification means, so as to perform verification on the mobile device for which a connection is established with the first bluetooth module via the second bluetooth module and the audio transceiver module using the transmission of the bluetooth signal and the transmission of the audio signal, and accordingly detects the relative position between the mobile device and the vehicle. When the mobile device is verified, the control unit performs a control function on the vehicle according to the operating state of the vehicle and the relative position between the mobile device and the vehicle.

The mobile device of the invention is adapted to perform passive keyless remote control on a vehicle. The mobile device includes a bluetooth module, an audio transceiver module, and a processing unit. The bluetooth module is configured to provide a bluetooth transmission interface (or optionally with a bluetooth signal). The audio transceiver module is controlled to transmit or receive an audio signal. The processing unit is electrically connected to the bluetooth module and the audio transceiver module to control the operations of the bluetooth module and the audio transceiver module. When the bluetooth module establishes a connection, the processing unit performs an audio verification means (or optionally with a bluetooth verification means), so as to provide verification information to the vehicle for which connection is established with the bluetooth module via the transmission of the audio signal (or optionally with the transmission of the bluetooth signal).

Based on the above, the control system, the control device, and the mobile device of a vehicle of the invention teach the use of a bluetooth transmission interface and an audio signal (or optionally with a bluetooth signal) to implement identity verification of the mobile device and short distance detection between the mobile device and the control device by using the control device, and the vehicle is controlled to perform a corresponding control function according to the position of the mobile device. A mobile device such as a general smart phone or tablet computer can also be used for implementation without changing the hardware design. As a result, the user only needs to carry the smart phone or tablet computer thereof as the remote sensor controller of the vehicle to achieve the function of automotive passive keyless entry on a general mobile device, and usage convenience of the user is increased as a result.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A and FIG. 4B are operation schematics of a control system of the first embodiment of the invention.

FIG. 13A and FIG. 13B are operation schematics of a control system of the eighth embodiment of the invention.

FIG. 14A and FIG. 14B are operation schematics of a control system of the ninth embodiment of the invention.

DESCRIPTION OF THE EMBODIMENTS

Figure 1:
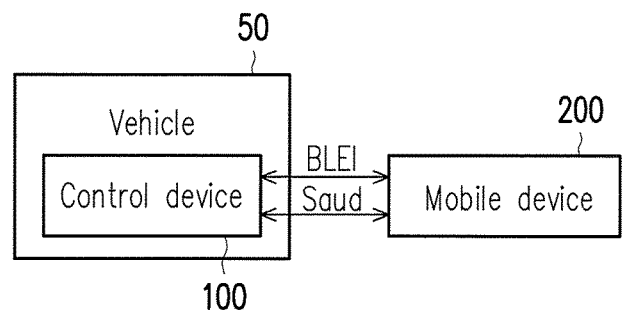
FIG. 1 is a function block schematic of a control system of an embodiment of the invention.

In the following, embodiments are provided as examples of actual implementation of the invention. Moreover, when applicable, devices/components/steps having the same reference numerals in figures and embodiments represent the same or similar parts.

FIG. 1 is a function block schematic of a control system of an embodiment of the invention. Referring to FIG. 1, a control system 10 of the present embodiment includes a control device 100 and a mobile device 200.

The control device 100 is adapted to be disposed on a vehicle 50. The vehicle 50 can refer to a general powered vehicle such as an automobile, a boat, or a plane. In particular, the control device 100 can be configured to perform a specific control function on the vehicle 50. Using the control device 100 disposed on a regular car as example, the control device 100 can perform various functions relating to car operation such as locking or unlocking car doors/car trunk lids, controlling the car to sound an alarm, such allowing or disabling engine start, and the invention does not limit the type of the control function.

The mobile device 200 can be, for instance, any electronic device having bluetooth function and audio transceiver function such as a smart phone, a smart watch, a smart bracelet, a tablet computer, a notebook computer, or a remote sensor controller, and the invention is not particularly limited in this regard.

In the present embodiment, a connection between the mobile device 200 and the control device 100 can be established via a bluetooth transmission interface BLEI, and the control device 100 can detect the relative position between the mobile device 200 and the vehicle 50 via a method of transmitting an audio signal Saud. Then, the control device 100 performs a corresponding control function according to the operating state of the vehicle 50 itself and the position of the mobile device 200 detected. In other words, from the perspective of the user, the control device 100 performs a corresponding control function according to the position of the user carrying the mobile device 200.

The bluetooth transmission interface BLEI can support the bluetooth communications protocol of various specifications (such as bluetooth 4.0, bluetooth 4.1, bluetooth Beacon), and the invention is not limited thereto. Moreover, the frequency of the audio signal Saud can be the frequency of infrasound, acoustic, or ultrasound. To satisfy the application of a general mobile device, an acoustic frequency can be used, but the invention is not limited thereto.

Specifically, the control device 100 and the mobile device 200 of the present embodiment can form a passive keyless entry (PKE) applied in the vehicle 50. The mobile device 200 can be used as a remote sensor controller of the system. When the control device 100 determines the mobile device 200 is close to the vehicle 50 or enters the vehicle 50 (i.e., the user is close to the vehicle 50 or enters the vehicle 50), the control device 100 automatically performs a corresponding control function, such as unlocking the door and starting the engine.

In the present application, identity verification and short distance detection of the mobile device 200 are achieved using the bluetooth transmission interface BLEI with the audio signal Saud, wherein the bluetooth module providing the bluetooth transmission interface BLEI and the audio transceiver module transmitting and receiving the audio signal Saud (such as a speaker or a microphone) are both built into a general mobile device. Therefore, when applied in the control system 10 of the present application, the mobile device 200 used as a remote sensor controller not only can be implemented using a device traditionally only having passive keyless entry function, a mobile device such as a general smart phone or tablet computer can also be used for the implementation.

Figure 2:
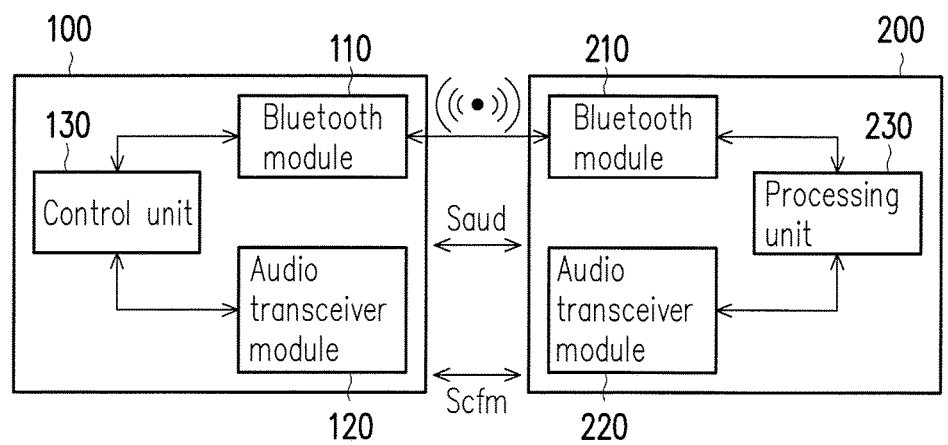
FIG. 2 is a function block schematic of a control device and a mobile device of an embodiment of the invention.

In the following, FIG. 2 is provided to describe the specific operations and functions of the control device 100 and the mobile device 200. In particular, FIG. 2 is a function block schematic of a control device and a mobile device of an embodiment of the invention.

Referring to FIG. 2, the control device 100 of the present embodiment includes a bluetooth module 110, an audio transceiver module 120, and a control unit 130. The mobile device 200 includes a bluetooth module 210, an audio transceiver module 220, and a processing unit 230.

The bluetooth modules 110 and 210 can be configured to provide the corresponding bluetooth transmission interface BLEI. After successful pairing, the bluetooth modules 110 and 210 automatically establish a connection in a bluetooth connection range (such as 10 meters) via the bluetooth transmission interface BLEI.

The audio transceiver modules 120 and 220 can be, for instance, audio transmitting units such as buzzers, piezoelectric buzzers, receivers, or speakers or audio receiving units such as microphones. The audio transceiver modules 120 and 220 are respectively controlled by the control unit 130 and the processing unit 230 to transmit or receive the audio signal Saud. In particular, the hardware configurations of the audio transceiver modules 120 and 220 can correspondingly be that one of the audio transceiver modules 120 and 220 is the audio transmitting end and the other is the audio receiving end based on the transmission method design requirement, so as to implement the transmission of the audio signal Saud.

For instance, if the control device 100 is served as the audio transmitting end and the mobile device 200 is used as the audio receiving end, then the audio transceiver module 120 can include an audio transmitting unit such as a buzzer, a buzz film, or a speaker to transmit the audio signal Saud, and the audio transceiver module 220 can include an audio receiving unit such as a microphone to receive the audio signal Saud. On the contrary, if the control device 100 is served as the audio receiving end, and the mobile device 200 is used as the audio transmitting end, then the audio transceiver module 120 is the audio receiving unit to receive the audio signal Saud, and the audio transceiver module 220 is the audio transmitting unit to transmit the audio signal Saud.

It should be mentioned that, for the general mobile device 200, a speaker and a microphone are generally provided together, and therefore the hardware configuration of the mobile device 200 does not need to be changed regardless of whether the mobile device 200 is used as the audio transmitting end or the audio receiving end. When served as the audio transmitting end, the mobile device 200 can enable the speaker to transmit the audio signal Saud; and when used as the audio receiving end, the mobile device 200 can enable the microphone to receive the audio signal Saud.

The control unit 130 and the processing unit 230 are respectively the control cores of the control device 100 and the mobile device 200. The control unit 130 can be used to control the operations of the bluetooth module 110, the audio transceiver module 120, and the vehicle 50, and the processing unit 230 can be used to control the operations of the bluetooth module 210, the audio transceiver module 220, and other components (such as a display module) in the mobile device 200. In the present embodiment, the hardware configuration of the control unit 130 can be implemented using an independent hardware, or using the processor of the trip computer provided in the vehicle 50, and the invention is not limited thereto. Moreover, the hardware configuration of the processing unit 230 can be implemented using the processor provided to the mobile device 200.

In the following, the operation of the control system 10 of the present application is described. After successful pairing, when the user carrying the mobile device 200 enters the bluetooth connection range of the bluetooth module 110, the control device 100 automatically establishes a connection with the mobile device 200.

When the bluetooth connection is established, the control device 100 and the mobile device 200 perform an audio verification means such that the control device 100 performs verification on the mobile device 200 via the transmission of the audio signal Saud and the control device 100 can accordingly detect the relative position between the mobile device 200 and the vehicle 50.

More specifically, when the audio verification means is performed, the device used as the audio transmitting end transmits an audio signal Saud, and the device used as the audio receiving end receives the audio signal Saud, and whether the signal waveform of the received audio signal Saud satisfies a preset signal requirement is determined. If the audio receiving end determines the signal waveform of the received audio signal Saud satisfies the preset signal requirement, then the mobile device 200 passes the verification is determined. On the other hand, if the audio receiving end determines the signal waveform of the received audio signal Saud does not satisfy the preset signal requirement, then the mobile device 200 does not pass the verification is determined.

For instance, the control device 100 is served as the audio transmitting end and the mobile device 200 is used as the audio receiving end as example. When the audio verification means is performed, the control unit 130 of the control device 100 enables the audio transceiver module 120 (implemented by an audio transmitting unit) to transmit the audio signal Saud. The processing unit 230 of the mobile device 200 enables the audio transceiver module 220 (implemented by an audio receiving unit) to receive the audio signal Saud. In particular, the processing unit 230 determines whether the signal waveform of the audio signal Saud received by the audio transceiver module 220 satisfies the preset signal requirement. When the processing unit 230 determines the signal waveform of the audio signal Saud satisfies the preset signal requirement, the processing unit 230 returns a confirmation signal Scfm to the control device 100 via the bluetooth transmission interface BLEI. When the bluetooth module 110 of the control device 100 receives the confirmation signal Scfm, the control unit 130 determines the mobile device 200 is verified.

In this example, from the perspective of the control device 100, when the audio verification means is performed, the control unit 130 enables the audio transceiver module 120 to transmit the audio signal Saud having a preset signal waveform based on the preset signal requirement. If the bluetooth module 110 receives the confirmation signal Scfm within a preset period, then the control unit 130 determines the mobile device 200 is verified. On the other hand, if the bluetooth module 110 does not receive the confirmation signal Scfmn within the preset period, then the control unit 130 determines the mobile device 200 is not verified.

Moreover, from the perspective of the mobile device 200, when the audio verification means is performed, the processing unit 230 enables the audio transceiver module 220 to receive the audio signal Saud. In particular, the processing unit 230 determines whether the signal waveform of the received audio signal Saud satisfies the preset signal requirement. If the signal waveform of the audio signal Saud satisfies the preset signal requirement, then the processing unit 230 returns the confirmation signal Scfm via the bluetooth module 210. On the other hand, if the signal waveform of the audio signal Saud does not satisfy the preset signal requirement, then the processing unit 230 does not return the confirmation signal Scfm.

The control device 100 is used as the audio receiving end and the mobile device 200 is used as the audio transmitting end. When the audio verification means is performed, the control unit 130 of the control device 100 enables the audio transceiver module 120 (implemented by an audio receiving unit) to receive the audio signal Saud. The processing unit 230 of the mobile device 200 enables the audio transceiver module 220 (implemented by an audio transmitting unit) to transmit the audio signal Saud. In particular, the control unit 130 determines whether the signal waveform of the audio signal Saud received by the audio transceiver module 120 satisfies the preset signal requirement. When the control unit 130 determines the signal waveform of the received audio signal Saud satisfies the preset signal requirement, the control unit 130 determines the mobile device 200 is verified. On the other hand, when the control unit 130 determines the signal waveform of the received audio signal Saud does not satisfy the preset signal requirement, the control unit 130 determines the mobile device 200 is not verified.

In this example, from the perspective of the control device 100, when the audio verification means is performed, the control unit 130 enables the audio transceiver module 120 to receive the audio signal Saud. If the control unit 130 determines the signal waveform of the audio signal Saud satisfies the preset signal requirement, then the control unit 130 determines the mobile device 200 is verified. On the other hand, if the control unit 130 determines the signal waveform of the audio signal Saud does not satisfy the preset signal requirement, then the control unit 130 determines the mobile device 200 is not verified.

Moreover, from the perspective of the mobile device 200, when the audio verification means is performed, the processing unit 230 enables the audio transceiver module 220 to transmit the audio signal Saud having a preset signal waveform based on the preset signal requirement, and uses the audio signal Saud as a verification information.

Moreover, it should be mentioned that, the preset signal requirement can be decided by the control device 100 or the mobile device 200. In an exemplary embodiment, one of the control device 100 and the mobile device 200 can provide information relating to the preset signal requirement to the other via the bluetooth transmission interface BLEI when the bluetooth connection is established, or the information can be respectively preset in the control device 100 and the mobile device 200. The invention is not limited thereto.

More specifically, the audio signal Saud can be an encrypted modulation signal generated by an encrypted specific signal modulation method, and the specific signal modulation method is, for instance, amplitude shift keying (ASK), frequency shift keying (FSK), or on/off keying (OOK), and the invention is not limited thereto. The signal waveform of the audio signal Saud is decided according to the specific signal modulation method, i.e., the frequency, amplitude, or phase of the audio signal Saud are decided according to the specific signal modulation method adopted. Therefore, the device used as the audio transmitting end generates and transmits the audio signal Saud according to the specific signal modulation method, and the device used as the audio receiving end receives the audio signal Saud, and whether the signal waveform of the received audio signal Saud satisfies a preset signal requirement is determined. Therefore, the device served as the audio receiving end can determine whether the signal waveform of the received audio signal Saud satisfies a preset signal requirement according to the frequency, amplitude, and/or phase of the audio signal Saud. Alternatively, the device served as the audio receiving end can also determine whether the signal waveform of the audio signal Saud received satisfies a preset signal requirement using time delay estimation (TDE) after digital signal processing.

After the mobile device 200 is verified, the control device 100 can perform the corresponding control function on the vehicle 50 according to the operating state of the vehicle 50 and the relative position between the mobile device 200 and the vehicle 50.

In the present embodiment, the audio signal transmission range of the audio signal Saud can be set to, for instance, 1.5 meters (but not limited thereto), and the audio transceiver module 120 can be optionally disposed inside or outside the vehicle 50 according to application requirements. In other words, from the perspective of the user, the control device 100 can detect whether the user carrying the mobile device 200 enters within 1.5 meters of the vehicle 50, or detect whether the user enters the vehicle 50, and accordingly controls the vehicle to perform a corresponding operation such as unlocking the door or initiating engine start.

Figure 3A:
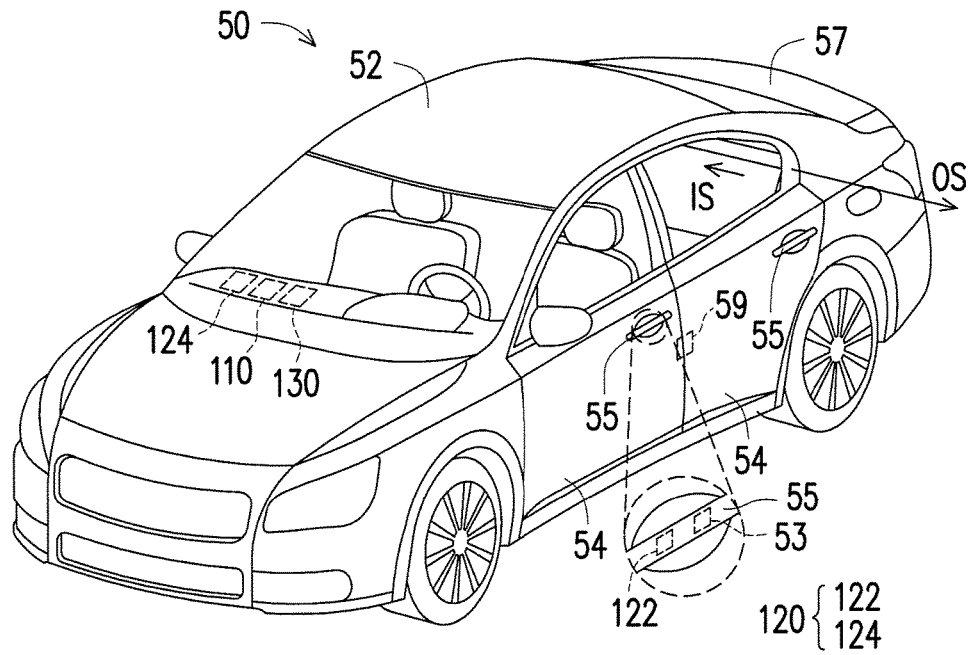
FIG. 3A and FIG. 3B are configuration schematics of a vehicle provided with a control device of an embodiment of the invention.
Figure 3B:
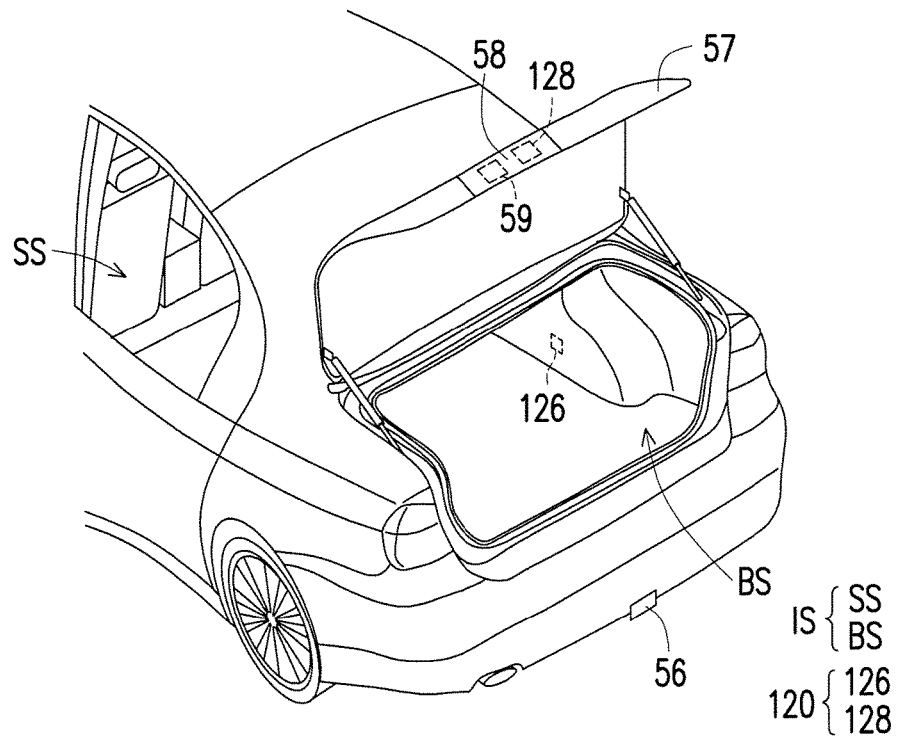

To more specifically describe a plurality of possible applications of the control system 10 of the present application, in the following, the vehicles and the system configurations shown in FIG. 3A and FIG. 3B are provided as examples. In particular, FIG. 3A and FIG. 3B are configuration schematics of a vehicle provided with a control device of an embodiment of the invention.

Referring to both FIG. 3A and FIG. 3B, in the present embodiment, the vehicle 50 is shown as a car ("car 50" hereinafter) as example, but the invention is not limited thereto. From the perspective of structural configuration, the car 50 includes a car body 52, a plurality of car door trigger buttons 53, a plurality of car doors 54, a plurality of car door handles 55, a car trunk lid trigger button 56, a car trunk lid 57, a car trunk lid handle 58, a plurality of locking components 59, and other members (such as windshields, rear view mirror, and tires, which are not repeated herein). In particular, the car door trigger buttons 53 are disposed on the car door handles 55. The car door handles 55 are disposed on the car doors 54. The car trunk lid trigger button 56 is disposed on the rear of the car body 52. The car doors 54 and the car trunk lid 57 are both disposed on the car body 52. The locking components 59 can be disposed on the car doors 54 and the car trunk lid 57, and can be controlled by the control unit 130 to lock or unlock the car doors 54 and the car trunk lid 57.

In the configuration of the car 50, the space formed by the car body 52, the car doors 54, and the car trunk lid 57 with the car windows and front and back windshields is defined as an inside space IS, and the space outside the car body 52 is defined as an outside space OS. In particular, the inside space IS can further be divided into a sitting space SS allowing passengers and the driver to sit and a trunk space BS formed by the car body 52 and the car trunk lid 57 for placing objects.

In a general car design, in the case that the car doors 54 are closed and the car windows are closed, the sitting space SS and the outside space OS are isolated from each other. Moreover, in the case that the car trunk lid 57 is closed, the trunk space BS and the outside space OS are isolated from each other. "Isolated from each other" means that the audio signal Saud cannot be transmitted between the two spaces, and therefore whether the mobile device 200 is located in the sitting space SS, the trunk space BS, or the outside space OS can be determined by whether or not the audio signal Saud is received. Alternatively, "isolated from each other" means that the audio signal Saud is not readily transmitted between the two spaces, such that the audio strength of the audio signal Saud differs significantly between the two spaces. Therefore, whether the mobile device 200 is located in the sitting space SS, the trunk space BS, or the outside space OS can be determined by determining whether the audio strength of the received audio signal Saud is greater than an audio strength threshold. To clearly describe the invention, in the following embodiments, the audio signal Saud is not readily transmitted between two spaces, but the invention is not limited thereto. In other words, if the mobile device 200 is located in the outside space OS, then the audio strength of the audio signal Saud transmitted by the audio transceiver module 120 in the inside space IS received by the mobile device 200 is not greater than the audio strength threshold, or the audio strength of the audio signal Saud transmitted by the mobile device 200 received by the audio transceiver module 120 disposed in the inside space IS is also not greater than the audio strength threshold.

In the present embodiment, the control device 100 is served as the audio transmitting end as example (but is not limited thereto), and the audio transceiver module 120 thereof includes, for instance, audio transmitting units 122, 124, 126, and 128. In particular, the bluetooth module 110, the audio transmitting unit 124, and the control unit 130 are disposed in the sitting space SS, the audio transmitting unit 126 is disposed in the trunk space BS, and the audio transmitting unit 122 is disposed on the car door handles 55, i.e., the outside of the car body 52 (outside space OS).

Moreover, the audio transmitting unit 128 is disposed on the car trunk lid handles 58, i.e., the exterior of the car body 52 (outside space OS).

Moreover, the car door trigger buttons 53 of the present embodiment can be, for instance, disposed on the car door handles 55 and electrically connected to the control unit 130 via a circuit. The user can unlock or lock the car doors 54 by triggering the car door trigger buttons 53. In particular, when the car door trigger buttons 53 are triggered, the car door trigger buttons 53 send a car door trigger signal to the control unit 130 such that the control unit 130 controls the locking components 59 to switch between locked state and unlocked state according to the car door trigger signal. The car trunk lid trigger button 56 can be, for instance, disposed in the rear of the car body 52 and electrically connected to the control unit 130 via a circuit. The user can unlock the car trunk lid 57 by triggering the car trunk lid trigger button 56. In particular, when the car trunk lid trigger button 56 is triggered, the car trunk lid trigger button 56 sends a car trunk lid trigger signal to the control unit 130 such that the control unit 130 controls the locking components 59 disposed on the car trunk lid 57 to switch to unlocked state according to the car trunk trigger signal.

Moreover, the car door trigger buttons 53 and the car trunk lid trigger button 56 can be implemented in any form of hardware, such as a mechanical button or a capacitive touch button. Therefore, the action of the user can be, for instance, pressing or touching, and the invention is not limited thereto.

More specifically, under the configuration of the control device 100 of the present embodiment, the audio transmitting units 122 and 128 can be controlled by the control unit 130 and transmit an audio signal toward the outside space OS, the audio transmitting unit 124 can be controlled by the control unit 130 to transmit an audio signal toward the sitting space SS, and the audio transmitting unit 126 can be controlled by the control unit 130 to transmit an audio signal toward the trunk space BS. In other words, the control device 100 of the present embodiment can detect whether the mobile device 200 is located in or close to the space to perform a specific function on the car 50 with the operating state of the car 50. In the following, the first to seventh embodiments shown in FIG. 4A to FIG. 10B are used to describe the control states of a plurality of different control devices 100. Although FIG. 4A to FIG. 10B all show the car 50 in a simple manner, in actuality, the descriptions of the first to seventh embodiments are all based on the configurations of the car 50 and the control device 100 shown in FIG. 3A and FIG. 3B.

FIG. 4A and FIG. 4B are operation schematics of a control system of the first embodiment of the invention. The application of passive door unlock is implemented.

Referring to FIG. 4A and FIG. 4B, in the present embodiment, the car 50 is preset to the state in which the locking components are in locked state and the engine is not started. When the user is to start the car 50, the user gradually approaches the car 50 carrying the mobile device 200. When the user enters a bluetooth connection range BSR, the control device 100 automatically establishes a bluetooth connection with the mobile device 200. At this point, the control device 100 provides information relating to the preset signal requirement to the mobile device 200 via the bluetooth transmission interface BLEI.

Then, when the user reaches the car 50 and triggers the car door trigger buttons 53, the control unit 130 of the control device 100 receives the car door trigger signal and provides the car door trigger signal to the mobile device 200 via the bluetooth transmission interface BLEI. At this point, the mobile device 200 enables the microphone to prepare to receive the audio signal Saud1. The control unit 130 accordingly enables the audio transmitting unit 122 to transmit the audio signal Saud1.

At this point, since the mobile device 200 is located within the audio signal transmission range ASR of the audio signal Saud1, the microphone of the mobile device 200 can receive the audio signal Saud1 transmitted by the audio transmitting unit 122. The mobile device 200 determines whether the signal waveform of the received audio signal Saud1 satisfies the preset signal requirement. It should be mentioned that, the audio signal transmission range ASR can be a range defined by whether the audio signal Saud1 is received, or the audio signal transmission range ASR can also be a range defined by whether the audio strength of the received audio signal Saud1 is greater than another audio strength threshold. The other audio strength threshold for deciding the audio signal transmission range ASR can be the same as or different from the audio strength threshold for identifying the inside space OS, the sitting space SS, and the trunk space BS isolated from one another, and the invention is not limited thereto. In other words, in addition to directly determining whether the audio signal Saud1 is received, the mobile device 200 can also determine whether the audio signal Saud1 is received according to whether the audio strength of the received audio signal Saud1 is greater than the audio strength threshold. The audio strength threshold value can be set according to actual demand, and the invention is not particularly limited in this regard.

If the user is a lawful user (possessing the pairing mobile device 200), then the mobile device 200 determines the signal waveform of the received audio signal Saud1 satisfies the preset signal requirement, and therefore a confirmation signal Scfm1 is further returned to the control device 100 via the bluetooth transmission interface BLEI. The control unit 130 then determines that the user currently triggering the car door trigger buttons 53 is a lawful user according to the received confirmation signal Scfm1, and therefore the locking components 59 are controlled to remove the locked state such that the user can open the car doors 54.

On the other hand, if the user is an unlawful user (possessing an unpaired mobile device), then the control device 100 does not establish a bluetooth connection with the non-pairing mobile device. Even if a lawful user is not located in the bluetooth sensing range and an unlawful user triggers the car door trigger buttons 53 at this point, since the unpaired mobile device does not analyze the signal waveform of the audio signal Saud1, the unpaired mobile device does not return the confirmation signal Scfm1. Therefore, the control device 100 determines the user currently triggering the car door trigger buttons 53 is an unlawful user, and controls the locking components 59 to maintain locked state and controls the car to sound an alarm.

In an application of the present embodiment, the control device 100 can also send a notice (such as flashing lights or emitting a sound) when the bluetooth connection is successfully established, such that the user can more easily determine the position of the car 50.

Figure 5A:
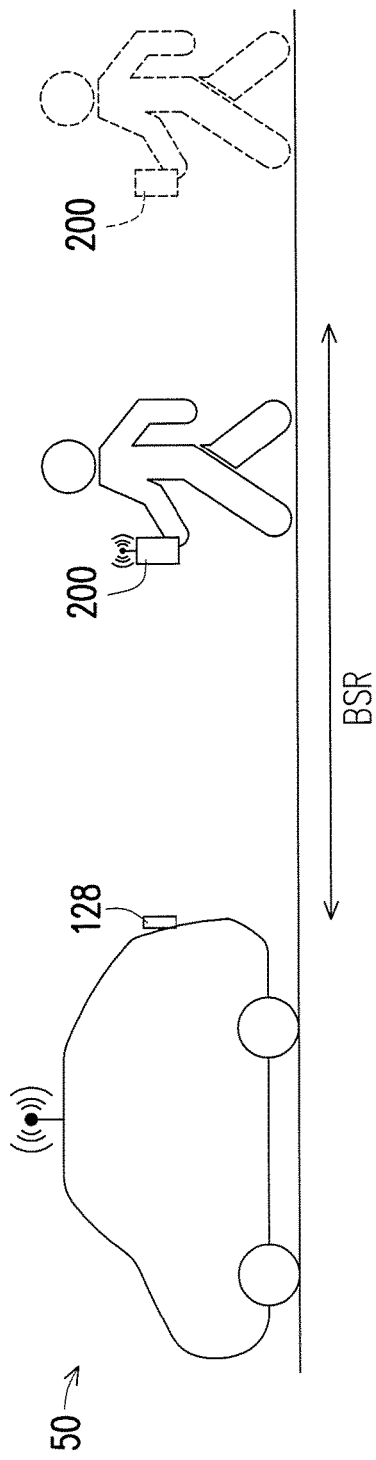
FIG. 5A and FIG. 5B are operation schematics of a control system of the second embodiment of the invention.
Figure 5B:
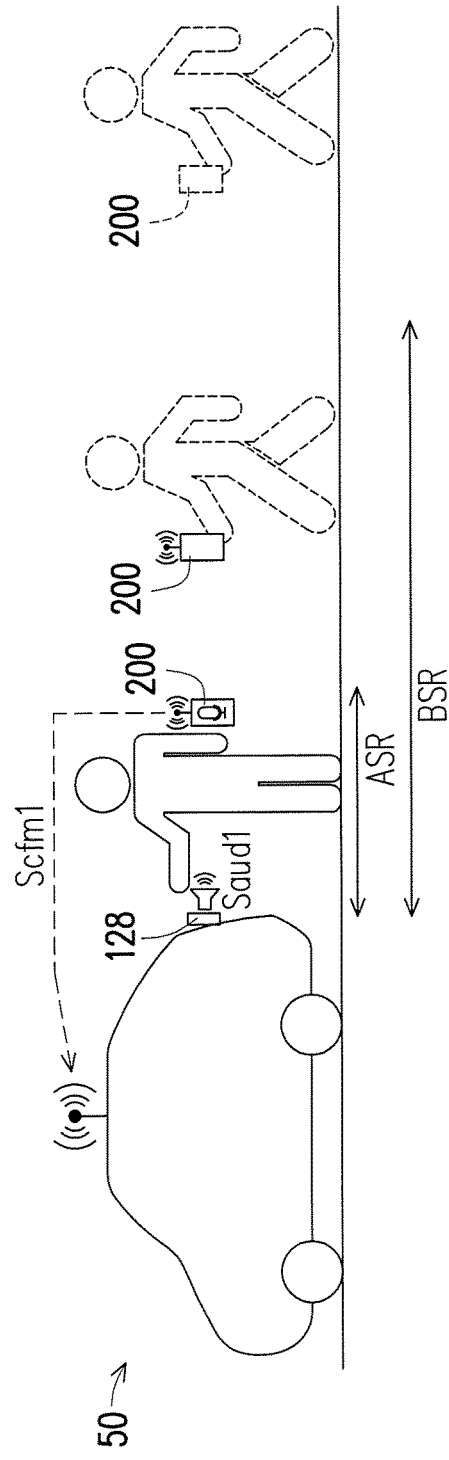

FIG. 5A and FIG. 5B are operation schematics of a control system of the second embodiment of the invention. The application of passive car trunk unlock is implemented.

Referring to FIG. 5A and FIG. 5B, the concept of the present embodiment is substantially the same as that of the first embodiment, and the difference between the two is mainly that, in the present embodiment, after the user triggers the car trunk lid trigger button 56 disposed in the rear of the car body 52, the control unit 130 makes the audio transmitting unit 128 transmit the audio signal Saud1 by enabling the audio transmitting unit 128 disposed on the car trunk lid handle 58 to detect whether the user opening the car trunk lid 57 is a lawful user. The specific signal transmission and unlock method are as described in the first embodiment and are not repeated herein.

In other words, in the applications of the first and second embodiments, with the locking components 59 in locked state, if the control unit 130 receives the trigger signal and determines the mobile device 200 is located in the outside space OS and is within a preset distance from the car body 52 (i.e., within the audio signal transmission range ASR) within a preset period, then the control unit 130 controls the locking components 59 to remove the locked state.

Figure 6A:
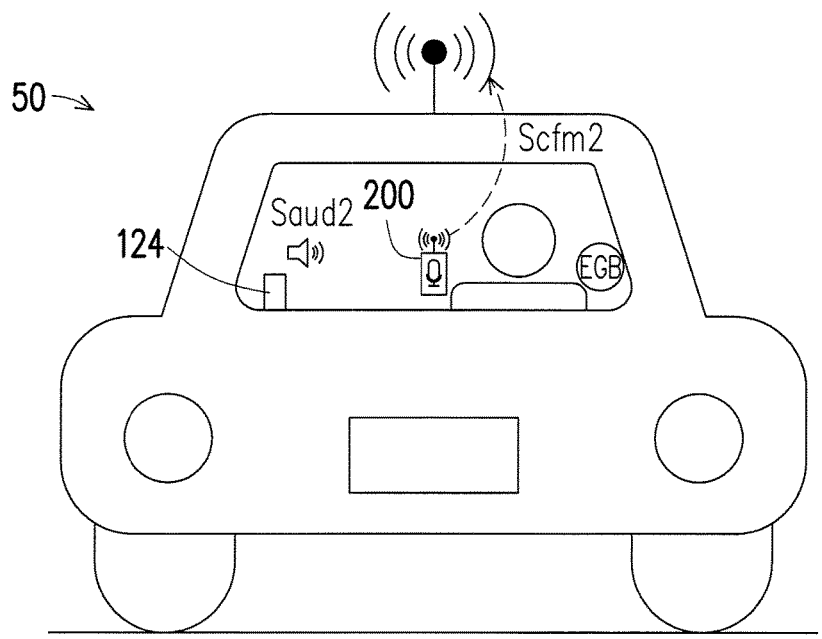
FIG. 6A and FIG. 6B are operation schematics of a control system of the third embodiment of the invention.
Figure 6B:
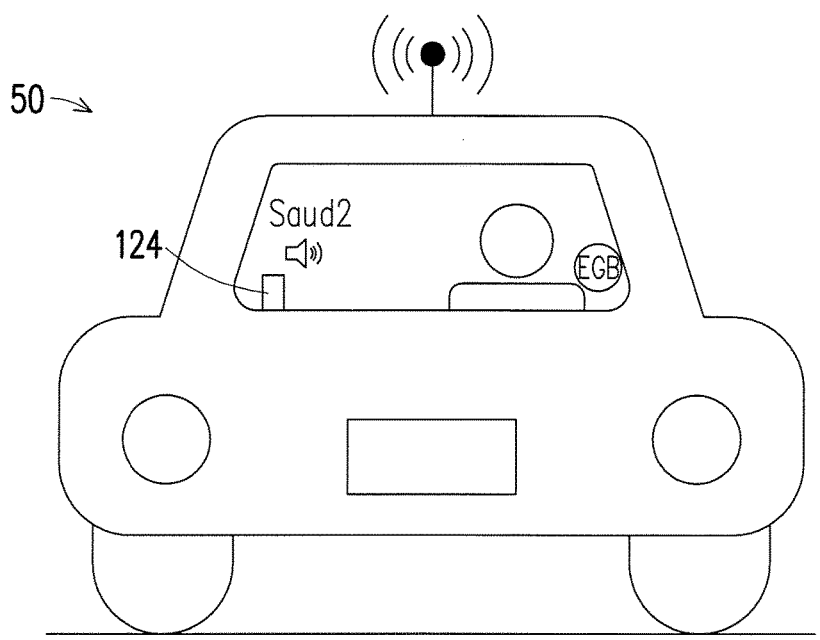

FIG. 6A and FIG. 6B are operation schematics of a control system of the third embodiment of the invention. The application of the engine start function is implemented.

Referring to FIG. 6A and FIG. 6B, in the present embodiment, the car 50 is preset to the state in which the engine is not started. After the user enters the car and closes the car doors 54, when the user presses an engine start button EGB, the control unit 130 enables the audio transmitting unit 124 in the car such that the audio transmitting unit 124 transmits an audio signal Saud2.

At this point, if the user also brings the mobile device 200 into the car as shown in FIG. 6A, then the mobile device 200 receives the audio signal Saud2 for which the audio strength is greater than the audio strength threshold, and after the signal waveform of the received audio signal Saud2 is determined to satisfy the preset signal requirement, a confirmation signal Scfm2 is returned to the control device 100 via the bluetooth transmission interface BLEI. The control unit 130 then determines the mobile device 200 is located in the sitting space SS according to the received confirmation signal Scfm2 and controls the car 50 to enter start mode from off mode.

If the user does not also bring the mobile device 200 inside the car as shown in FIG. 6B, then the audio strength of the audio signal Saud2 transmitted by the audio transmitting unit 124 in the car and received by the mobile device 200 located outside the car is not greater than the audio strength threshold, and therefore the control unit 130 determines the mobile device 200 is not located in the sitting space SS after the preset period, and controls the car 50 to remain in off mode, and controls the car 50 to send an alarm to notify the driver that the mobile device 200 is not in the car.

Figure 7:
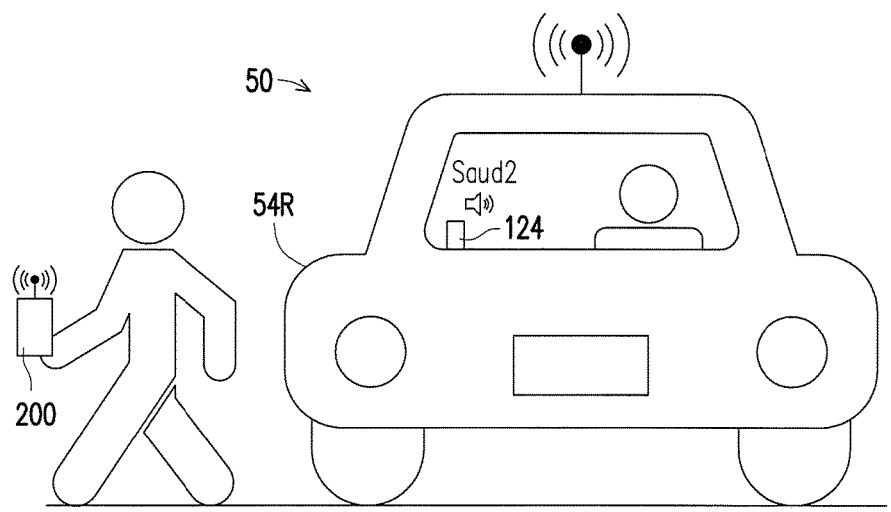
FIG. 7 is an operation schematic of a control system of the fourth embodiment of the invention.

FIG. 7 is an operation schematic of a control system of the fourth embodiment of the invention. The application of detecting whether the mobile device 200 is unexpectedly taken from the car is implemented.

Referring to FIG. 7, in the present embodiment, the control unit 130 detects whether a non-driver side car door 54R is open, and enables the audio transmitting unit 124 in the car after the non-driver side car door 54R is opened and then closed, such that the audio transmitting unit 124 transmits the audio signal Saud2.

At this point, if the control unit 130 determines the mobile device 200 is not taken, then the control unit 130 does not change the operating state of the car 50.

On the other hand, if a passenger in the car 50 leaves the car from the non-driver side car door 54R and accidentally takes the mobile device 200 out of the car, then the audio strength of the audio signal Saud2 transmitted by the audio transmitting unit 124 in the car and received by the mobile device 200 is not greater than the audio strength threshold, and therefore the control unit 130 determines the mobile device 200 is not located in the sitting space SS after the preset period, and therefore controls the car 50 to send an alarm prompt to notify the driver that the mobile device 200 is not in the car. Moreover, the mobile device 200 also sends an alarm prompt to remind the passenger that the mobile device 200 is taken outside the car.

Figure 8A:
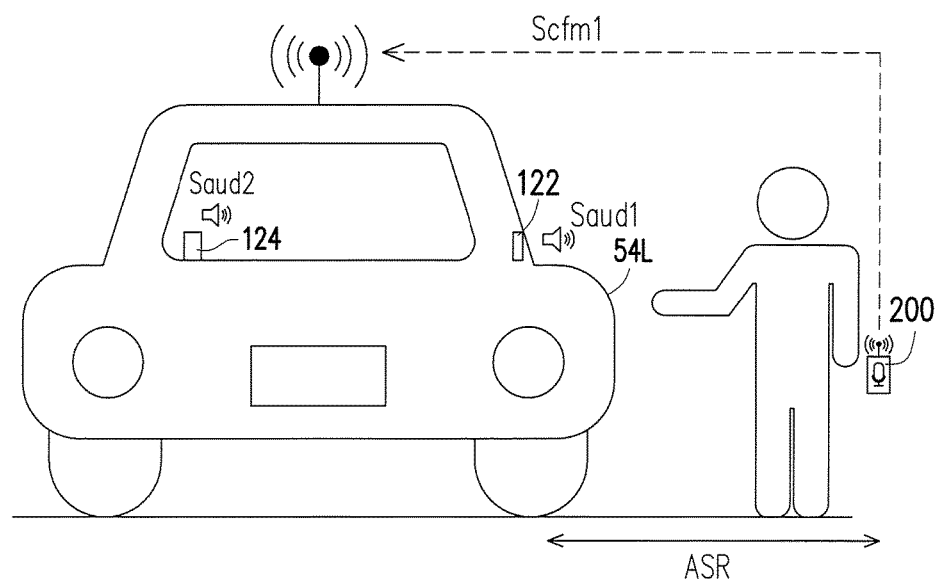
FIG. 8A and FIG. 8B are operation schematics of a control system of the fifth embodiment of the invention.
Figure 8B:
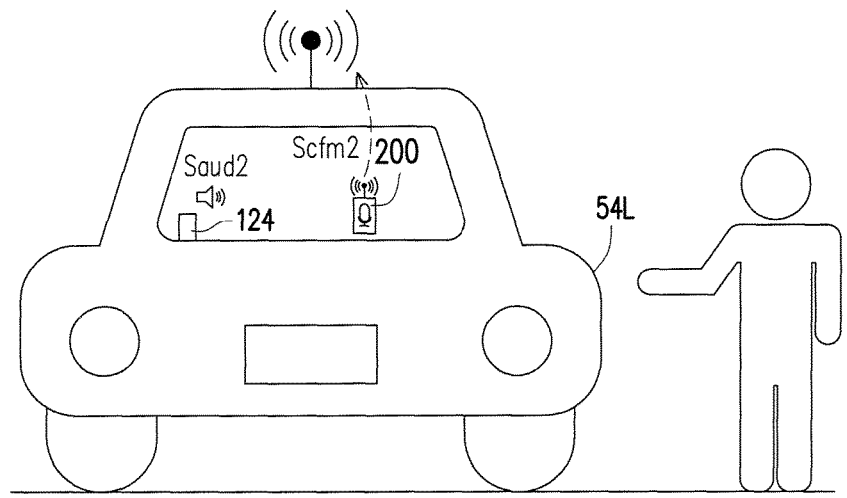

FIG. 8A and FIG. 8B are operation schematics of a control system of the fifth embodiment of the invention. The application of detecting whether the mobile device 200 is left in the car to decide whether the car doors are locked is implemented.

Referring to FIG. 8A and FIG. 8B, in the present embodiment, the car 50 is preset to the state in which the locking components 59 are in unlocked state and the engine is not started. The control unit 130 detects whether a driver side car door 54L is open, and enables the audio transmitting unit 124 in the car after the driver side car door 54L is opened and then closed, such that the audio transmitting unit 124 transmits the audio signal Saud2.

At this point, if the driver does not leave the mobile device 200 in the car as shown in FIG. 8A, then the control unit 130 determines the mobile device 200 is not located in the car when the confirmation signal Scfm2 is not received after the preset period. Therefore, the control unit 130 enables the audio transmitting unit 122 on the car door handles 55 when the car door trigger signal is received (i.e., when the driver triggers the car door trigger buttons 53) such that the audio transmitting unit 122 transmits the audio signal Saud1. Therefore, the control unit 130 receives the confirmation signal Scfm1 and determines the driver triggers the car door trigger buttons 53. The locking components 59 are switched to locked state to lock the car 50.

On the other hand, if the driver leaves the mobile device 200 in the car as shown in FIG. 8B, then the control unit 130 receives the confirmation signal Scfm2 returned by the mobile device 200 in response to the audio signal Saud2 and determines the mobile device 200 is located in the car. Therefore, the control unit 130 controls the car 50 to send an alarm prompt and controls the locking components 59 to remain in unlocked state when the control unit 130 receives the car door trigger signal (i.e., when the driver triggers the car door trigger buttons 53), so as to prevent the car 50 from locking when the driver forgets the mobile device 200 in the car.

In an application of the present embodiment, if the control unit 130 determines the mobile device 200 is taken outside the car by the driver but the driver does not trigger the car door trigger buttons 53 within a period of time or is outside the bluetooth connection range BSR, then the control unit 130 or the processing unit 230 can send an alarm prompt to remind the driver that the car 50 is not locked. Moreover, the control unit 130 can also decide whether or not to automatically lock the car doors according to the design specification requirements of the car 50 or the settings of the driver.

Figure 9:
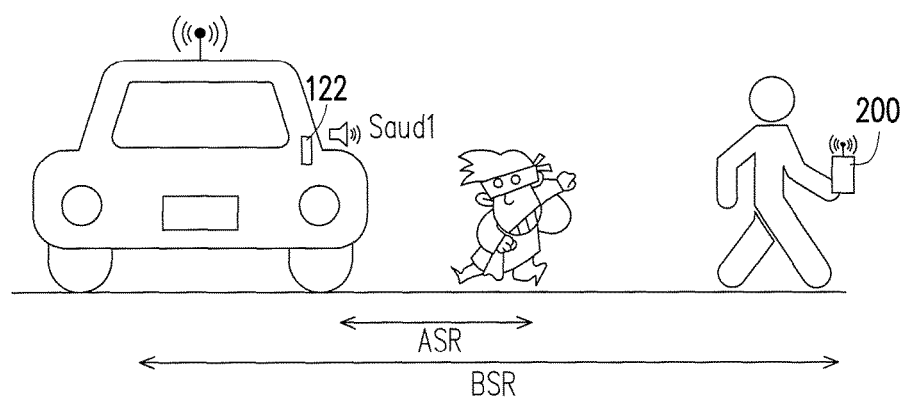
FIG. 9 is an operation schematic of a control system of the sixth embodiment of the invention.

FIG. 9 is an operation schematic of a control system of the sixth embodiment of the invention. The application of anti-theft detection is implemented.

Referring to FIG. 9, in the present embodiment, the car 50 is preset to the state in which the locking components 59 are in locked state. In the case that the lawful user locks the car 50 and is to leave, if an unlawful user is to open the car doors and triggers the car door trigger buttons 53, then the control unit 130 enables the audio transmitting unit 122 outside the car when the car door trigger signal is received, such that the audio transmitting unit 122 transmits the audio signal Saud1.

At this point, the lawful user should be located outside the audio signal transmission range ASR of the audio signal Saud1, such that the mobile device 200 cannot receive the audio signal Saud1 or the audio strength of the audio signal Saud1 received thereby is not greater than the audio strength threshold. Therefore, the control unit 130 determines the user currently triggering the car door trigger buttons 53 is an unlawful user after the preset period, and accordingly controls the car 50 to send an anti-theft alarm or controls the mobile device 200 to send an anti-theft alarm.

Figure 10A:
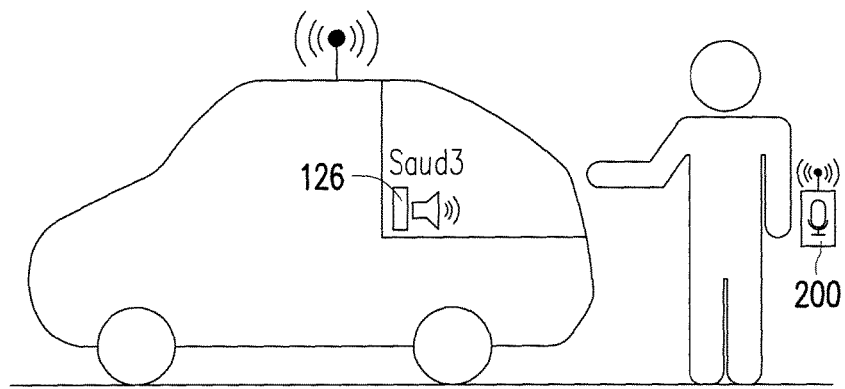
FIG. 10A and FIG. 10B are operation schematics of a control system of the seventh embodiment of the invention.
Figure 10B:
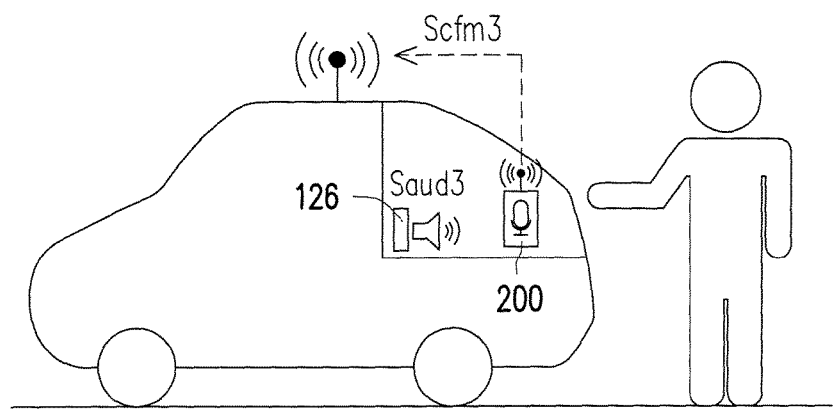

FIG. 10A and FIG. 10B are operation schematics of a control system of the seventh embodiment of the invention. The application of detecting whether the mobile device 200 is left in the car trunk to decide whether or not to close the car trunk lid is implemented.

Referring to FIG. 10A and FIG. 10B, in the present embodiment, the car 50 is preset to the state in which the locking components on the car trunk lid 57 are in unlocked state, i.e., the car trunk lid is in open state. The control unit 130 detects whether the car trunk lid 57 is open or closed, and when the car trunk lid 57 is closed, the locking components 59 on the car trunk lid 57 are switched to locked state and the audio transmitting unit 126 in the trunk space BS is enabled, such that the audio transmitting unit 126 transmits an audio signal Saud3.

At this point, if the user does not leave the mobile device 200 in the car trunk as shown in FIG. 10A, then the control unit 130 determines the mobile device 200 is not located in the car trunk when the confirmation signal is not received after the preset period. Therefore, the control unit 130 keeps the locking components on the car trunk lid 57 in locked state to lock the car trunk lid 57.

On the other hand, if the user leaves the mobile device 200 in the car trunk as shown in FIG. 10B, then the control unit 130 receives the confirmation signal Scfm3 returned by the mobile device 200 in response to the audio signal Saud3 and determines the mobile device 200 is located in the car trunk. Therefore, the control unit 130 controls the car 50 to send an alarm prompt and controls the locking components on the car trunk lid 57 to switch to unlocked state to open the car trunk lid 57, so as to prevent the driver from accidentally locking the car trunk lid 57 when the mobile device 200 is left in the car trunk.

In addition to the above applications, in the present application, the pairing action of sending the passkey in an out of band (OOB) manner can also be achieved using the audio signal Saud, and by making the inside space IS an isolated space, man-in-the-middle attack (MITM attack) can be prevented, such that pairing safety is increased.

Referring to FIG. 6A, when the control device 100 and the mobile device 200 are not paired with each other and the bluetooth connection has not established yet, the control unit 130 enables the audio transmitting unit 124 and the bluetooth module 110 in the car when all of the car doors are closed, so as to make the audio transmitting unit 124 send a bluetooth passkey by transmitting the audio signal Saud2.

At this point, the mobile device 200 receives the audio signal Saud2, and performs bluetooth pairing according to the passkey contained in the audio signal Saud2, so as to establish bluetooth connection between the control device 100 and the mobile device 200.

Figure 11:
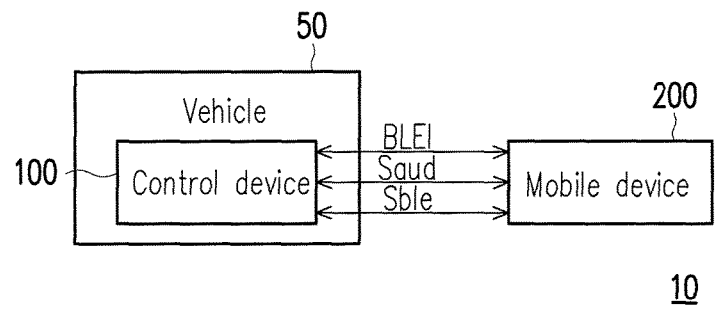
FIG. 11 is a function block schematic of a control system of another embodiment of the invention.
Figure 12:
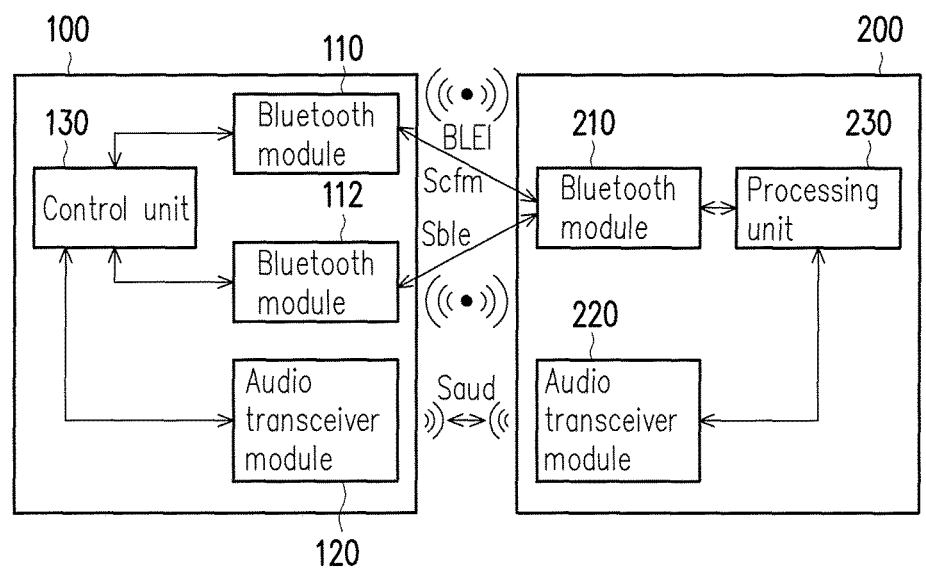
FIG. 12 is a function block schematic of a control device and a mobile device of another embodiment of the invention.

In the following, FIG. 11 and FIG. 12 are used to describe the specific operations and functions of the control device and the mobile device in another exemplary embodiment. In particular, FIG. 11 is a function block schematic of a control system of another embodiment of the invention. FIG. 12 is a function block schematic of a control device and a mobile device of another embodiment of the invention.

Referring to FIG. 11, the structure shown in FIG. 11 is substantially the same as that of FIG. 1, and the difference between the two is that, the control device 100 and the mobile device 200 perform an audio verification means and a bluetooth verification means. In the embodiment shown in FIG. 11, a connection between the mobile device 200 and the control device 100 can be established via the bluetooth transmission interface BLEI, and the control device 100 can detect the relative position between the mobile device 200 and the vehicle 50 via a method of transmitting the audio signal Saud and transmitting a bluetooth signal Sble. Then, the control device 100 performs a corresponding control function according to the operating state of the vehicle 50 itself and the position of the mobile device 200 detected. The bluetooth signal Sble can be a bluetooth communications protocol of various specifications (such as bluetooth 4.0, bluetooth 4.1, or bluetooth Beacon), and the invention is not limited thereto.

More specifically, in the embodiment shown in FIG. 11, the control device 100 can determine the distance between the mobile device 200 and the vehicle 50 via the transmission of the bluetooth signal Sble. Moreover, the control device 100 can determine if the mobile device 200 is located in the outside space OS, the sitting space SS, or the trunk space BS via the transmission of the audio signal Saud.

Referring further to FIG. 12, the structure of the present embodiment is substantially the same as that of FIG. 2. The main difference between the two is that in the present embodiment, a received signal strength indicator (RSSI) verifying the bluetooth signal Sble is used to determine the distance between the mobile device 200 and the control device 100 to replace the function of transmitting the audio signal Saud toward the outside space OS or receiving the audio signal Saud in the audio transceiver module 120. The embodiment shown in FIG. 12 is exemplified by adding a bluetooth module 112 to generate the bluetooth signal Sble, but the invention is not limited thereto, and the bluetooth signal Sble can also be generated by the bluetooth module 110 providing the bluetooth transmission interface.

Specifically, the control device 100 of the present embodiment includes a bluetooth module 110, a bluetooth module 112, an audio transceiver module 120, and a control unit 130. The mobile device 200 includes a bluetooth module 210, an audio transceiver module 220, and a processing unit 230.

In the present embodiment, the bluetooth module 110 is configured to provide the corresponding bluetooth transmission interface BLEI with the bluetooth module 210 of the mobile device 200, such that a connection can be automatically established between the bluetooth modules 110 and 210 via the bluetooth transmission interface BLEI in the bluetooth connection range after successful pairing.

The bluetooth module 112 of the present embodiment is mainly used to transmit or receive the bluetooth signal Sble, wherein since the RSSI value of the bluetooth signal Sble is substantially in a proportional relationship with the distance from the device (i.e., the closer the mobile device 200 is to the control device 100, the higher the RSSI value of the bluetooth signal Sble sensed). Based on this characteristic, the control device 100 of the present embodiment can use the RSSI value of the bluetooth signal Sble as the basis for verifying the distance between the mobile device 200 and the vehicle.

In the following, the operation of the control system 10 of the present application is described. After successful pairing, when the user carrying the mobile device 200 enters the bluetooth connection range of the bluetooth module 110, the control device 100 automatically establishes a connection with the mobile device 200.

When the bluetooth connection is established, the control device 100 and the mobile device 200 perform a bluetooth verification means and an audio verification means such that the control device 100 performs verification on the mobile device 200 via the transmission of the bluetooth signal Sble and the transmission of the audio signal Saud and the control device 100 can accordingly detect the relative position between the mobile device 200 and the vehicle 50.

More specifically, when the bluetooth verification means is performed, the device served as the bluetooth signal transmitting end transmits the bluetooth signal Sble, and the device served as the bluetooth signal receiving end receives the bluetooth signal Sble, and whether the RSSI value of the received bluetooth signal Sble is located in a preset strength range is determined. When the audio verification means is performed, the device served as the audio transmitting end transmits the audio signal Saud satisfying a preset signal requirement, the device served as the audio receiving end receives the audio signal Saud, and whether the audio strength of the received audio signal Saud is greater than an audio strength threshold and whether the signal waveform thereof satisfies the preset signal requirement are determined. If the bluetooth signal receiving end determines the RSSI value of the received bluetooth signal Sble is located in the preset strength range and the audio strength of the audio signal Saud received by the audio receiving end is not greater than the audio strength threshold, then the mobile device 200 is determined to be verified. On the other hand, if the bluetooth signal receiving end determines the RSSI value of the received bluetooth signal Sble is located outside the preset strength range, then the mobile device 200 does not pass the verification is determined. Alternatively, if the bluetooth signal receiving end determines the RSSI value of the received bluetooth signal Sble is located in the preset strength range and the audio strength of the audio signal Saud received by the audio receiving end is greater than the audio strength threshold and the signal waveform of the audio signal Saud satisfies the preset signal requirement, then the mobile device 200 does not pass the verification is determined.

For instance, the control device 100 is served as the bluetooth signal transmitting end and the audio transmitting end, and the mobile device 200 is served as the bluetooth signal receiving end and the audio receiving end as example. When the bluetooth verification means and the audio verification means are performed, the control unit 130 of the control device 100 enables the bluetooth module 112 to transmit the bluetooth signal Sble and enables the audio transceiver module 120 to transmit the audio signal Saud according to a preset signal requirement. The processing unit 230 of the mobile device 200 enables the bluetooth module 210 to receive the bluetooth signal Sble and enables the audio transceiver module 220 to receive the audio signal Saud. In particular, the processing unit 230 determines whether the RSSI value of the bluetooth signal Sble received by the bluetooth module 210 is located in the preset strength range and determines whether the audio strength of the audio signal Saud received by the audio transceiver module 220 in the preset period is greater than the audio strength threshold and whether the signal waveform thereof satisfies the preset signal requirement. When the processing unit 230 determines the RSSI value of the bluetooth signal Sble is located in the preset strength range and the audio strength of the audio signal Saud received in the preset period is not greater than the audio strength threshold, then the processing unit 230 returns the confirmation signal Scfm to the control device 100 via the bluetooth transmission interface BLEI. When the bluetooth module 110 of the control device 100 receives the confirmation signal Scfm, the control unit 130 determines the mobile device 200 is verified. When the processing unit 230 determines the RSSI value of the bluetooth signal Sble is located outside the preset strength range, the processing unit 230 does not return the confirmation signal Scfm to the control device 100 via the bluetooth transmission interface BLEI. Alternatively, if the processing unit 230 determines the RSSI value of the received bluetooth signal Sble is located in the preset strength range and the audio strength of the audio signal Saud received in the preset period is greater than the audio strength threshold and the signal waveform thereof satisfies the preset signal requirement, then the processing unit 230 does not return the confirmation signal Scfm to the control device 100 via the bluetooth transmission interface BLEI. When the bluetooth module 110 of the control device 100 does not receive the confirmation signal Scfm in the preset period, the control unit 130 determines the mobile device 200 is not verified.

In this example, from the perspective of the control device 100, when the bluetooth verification means and the audio verification means are performed, the control unit 130 enables the bluetooth module 112 to transmit the bluetooth signal Sble and enables the audio transceiver module 120 to transmit the audio signal Saud satisfying a preset signal requirement. If the bluetooth module 110 receives the confirmation signal Scfm within a preset period, then the control unit 130 determines the mobile device 200 is verified. On the other hand, if the bluetooth module 110 does not receive the confirmation signal Scfm within the preset period, then the control unit 130 determines the mobile device 200 is not verified.

Moreover, from the perspective of the mobile device 200, when the bluetooth verification means and the audio verification means are performed, the processing unit 230 determines whether the RSSI value of the bluetooth signal Sble received by the bluetooth module 210 is located in the preset strength range and determines whether the audio strength of the audio signal Saud received by the audio transceiver module 220 is greater than the audio strength threshold, and whether the signal waveform thereof satisfies the preset signal requirement. If the RSSI value of the bluetooth signal Sble is located in the preset strength range and the audio strength of the audio signal Saud received in the preset period is not greater than the audio strength threshold, then the processing unit 230 returns the confirmation signal Scfm via the bluetooth module 210. On the other hand, when the processing unit 230 determines the RSSI value of the bluetooth signal Sble is located outside the preset strength range, or the RSSI value of the bluetooth signal Sble is located in the preset strength range and the audio strength of the audio signal Saud received in the preset period is greater than the audio strength threshold, and the signal waveform thereof satisfies the preset signal requirement, the processing unit 230 does not return the confirmation signal Scfm.

The control device 100 is served as the bluetooth signal receiving end and the audio receiving end, and the mobile device 200 is served as the bluetooth signal transmitting end and the audio transmitting end as example. When the bluetooth verification means and the audio verification means are performed, the control unit 130 of the control device 100 enables the bluetooth module 112 to receive the bluetooth signal Sble and enable the audio transceiver module 120 to receive the audio signal Saud. The processing unit 230 of the mobile device 200 enables the bluetooth module 210 to transmit the bluetooth signal Sble and enables the audio transceiver module 220 to transmit the audio signal Saud satisfying a preset signal requirement. In particular, the control unit 130 determines whether the RSSI value of the bluetooth signal Sble received by the bluetooth module 112 is located in the preset strength range and whether the audio strength of the audio signal Saud received by the audio transceiver module 120 in the preset period is greater than the audio strength threshold and whether the signal waveform thereof satisfies the preset signal requirement. When the control unit 130 determines the RSSI value of the received bluetooth signal Sble is located in the preset strength range and the audio strength of the audio signal Saud received in the preset period is not greater than the audio strength threshold, the control unit 130 determines the mobile device 200 is verified. On the other hand, when the control unit 130 determines the RSSI value of the received bluetooth signal Sble is located outside the preset strength range, or the RSSI value of the bluetooth signal Sble is located in the preset strength range and the audio strength of the audio signal Saud received in the preset period is greater than the audio strength threshold, and the signal waveform thereof satisfies the preset signal requirement, the control unit 130 determines the mobile device 200 is not verified.

In this example, from the perspective of the control device 100, when the bluetooth verification means and the audio verification means are performed, the control unit 130 enables the bluetooth module 112 to receive the bluetooth signal Sble and enables the audio transceiver module 120 to receive the audio signal Saud. If the control unit 130 determines the RSSI value of the bluetooth signal Sble is located in the preset strength range and the audio strength of the audio signal Saud received in the preset period is not greater than the audio strength threshold, then the control unit 130 determines the mobile device 200 is verified. On the other hand, if the control unit 130 determines the RSSI value of the bluetooth signal Sble is located outside the preset strength range, or the RSSI value of the bluetooth signal Sble is located in the preset strength range and the audio strength of the audio signal Saud received in the preset period is greater than the audio strength threshold, and the signal waveform thereof satisfies the preset signal requirement, then the control unit 130 determines the mobile device 200 is not verified.

Moreover, from the perspective of the mobile device 200, when the bluetooth verification means is performed, the processing unit 230 controls the bluetooth module 210 to transmit the bluetooth signal Sble. When the audio verification means is performed, the audio transceiver module 220 transmits the audio signal Saud satisfying a preset signal requirement, and uses the audio signal Saud as a verification information.

Moreover, the detailed signal transmission of the case of using the control device 100 as the bluetooth signal transmitting end and the audio receiving end and using the mobile device 200 as the bluetooth signal receiving end and the audio transmitting end, and the detailed signal transmission of the other case of using the control device 100 as the bluetooth signal receiving end and the audio transmitting end and using the mobile device 200 as the bluetooth signal transmitting end and the audio receiving end are as described in the above two examples and is not repeated herein.

After the mobile device 200 is verified, the control device 100 can perform the corresponding control function on the vehicle according to the operating state of the vehicle and the relative position between the mobile device 200 and the vehicle.

In the present embodiment, the bluetooth signal Sble can be, for instance, set to have the RSSI value located in the preset strength range (such as ≥−60 dBm) when two devices are within 1.5 meters of each other (but not limited thereto). Therefore, whether the mobile device 200 is located in the sitting space SS, the trunk space BS, or the outside space OS can be determined by determining whether the audio strength of the received audio signal Saud is greater than the audio strength threshold. In other words, from the perspective of the user, the control device 100 can detect whether the user carrying the mobile device 200 enters within 1.5 meters of the vehicle 50, or detect whether the user enters the vehicle 50, and accordingly controls the vehicle to perform a corresponding operation such as unlocking the car doors.

From the perspective of the specific structure of the control system, since the bluetooth module 112 of the present embodiment replaces the function of transmitting the audio signal toward the outside space OS or receiving the audio signal in the audio transceiver module 120 with the verification function in the above embodiment by transmitting or receiving the bluetooth signal Sble, the configuration of the bluetooth module 112 on the vehicle can be similar to the configuration of the audio transmitting units 122 and 128 in the audio transceiver unit 120 in FIG. 3A and FIG. 3B. In other words, the bluetooth module 112 of the present embodiment can be disposed on the car doors 54/car door handles 55 or disposed on the car trunk lid handle 58.

In the following, the eighth to eleventh embodiments shown in FIG. 13A to FIG. 16 are used to describe the control states of a plurality of different control devices 100.

FIG. 13A and FIG. 13B are operation schematics of a control system of the eighth embodiment of the invention. The application of passive door unlock is implemented. Referring to FIG. 13A and FIG. 13B, in the present embodiment, the car 50 is preset to the state in which the locking components are in locked state and the engine is not started. When the user is to start the car 50, the user gradually approaches the car 50 carrying the mobile device 200. When the user enters a bluetooth connection range BSR, the control device 100 automatically establishes a bluetooth connection with the mobile device 200.

Then, when the user reaches the car 50 and triggers the car door trigger buttons 53, the control unit 130 of the control device 100 receives the car door trigger signal and accordingly enables the bluetooth module 112 to transmit the bluetooth signal Sble and enables the audio transmitting unit 124 to transmit the audio signal Saud2 satisfying a preset signal requirement. It is assumed here that the RSSI values of the bluetooth signal Sble in a preset range PR from the car doors are all located in the preset strength range.

If the user is a lawful user (carrying a paired mobile device 200), then when the user triggers the car door trigger buttons 53, since the mobile device 200 is sufficiently close to the car doors and is located in the outside space OS, the RSSI value of the bluetooth signal Sble received by the mobile device 200 is determined to be located in the preset strength range and the audio strength of the audio signal Saud2 received in the preset period is not greater than the audio strength threshold, and therefore the mobile device 200 can further return the confirmation signal Scfm1 to the control device 100 via the bluetooth transmission interface BLEI. The control unit 130 then determines that the user currently triggering the car door trigger buttons 53 is a lawful user according to the received confirmation signal Scfm1, and therefore the locking components 59 are controlled to remove the locked state such that the user can open the car doors 54.

On the other hand, if the user is an unlawful user (possessing an unpaired mobile device), then the control device 100 does not establish a bluetooth connection with the unpaired mobile device. Even if a lawful user is not located in the bluetooth sensing range and an unlawful user triggers the car door trigger buttons 53 at this point, the unpaired mobile device does not perform the action of determining whether the RSSI value of the bluetooth signal Sble is located in the preset strength range and also does not return the confirmation signal Scfm1. Therefore, the control device 100 determines the user currently triggering the car door trigger buttons 53 is an unlawful user, and controls the locking components 59 to remain in locked state and controls the car to send an alarm prompt.

It should be mentioned that, when the control device 100 receives the confirmation signal Scfm1, the control device 100 determines the mobile device 200 is located in the outside space and is within the preset distance from the car body. When the control device 100 does not receive the confirmation signal Scfm1, the control device 100 determines the mobile device 200 is located in the inside space or is located in the outside space and is farther than the preset distance away from the car body. As a result, when the lawful user carries the mobile device 200 and is located in the inside space, others located in the outside space cannot change the locked state of the locking components 59 without the permission of the lawful user.

FIG. 14A and FIG. 14B are operation schematics of a control system of the ninth embodiment of the invention. FIG. 14A and FIG. 14B show the application of implementing passive car trunk unlock. The concept of the present embodiment is substantially the same as that of the eighth embodiment, and the difference between the two is mainly that, in the present embodiment, after the user triggers the car trunk lid trigger button 56 disposed in the rear of the car body 52, the control unit 130 makes the bluetooth module 112 transmit the bluetooth signal Sble by enabling the bluetooth module 112 disposed on the car trunk lid handle 58 to detect whether the user opening the car trunk lid 57 is a lawful user. The specific signal transmission and unlocking method are as described in the eighth embodiment and are not repeated herein.

In other words, in the applications of the eighth and ninth embodiments, with the locking components 59 in locked state, if the control unit 130 receives the trigger signal and determines the mobile device 200 is located in the outside space OS and is within the preset distance PR from the car body 52, then the control unit 130 controls the locking components 59 to remove the locked state.

Figure 15A:
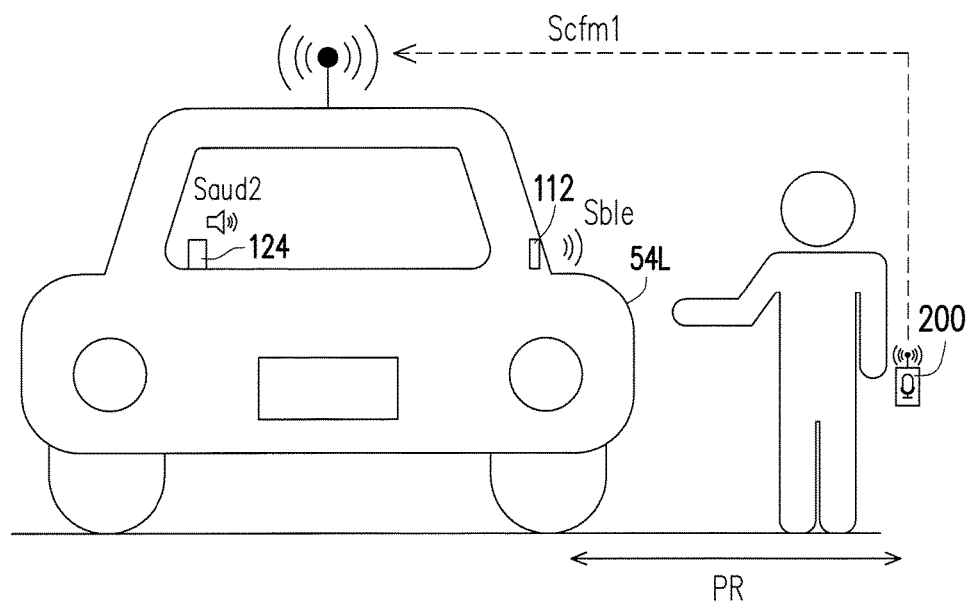
FIG. 15A and FIG. 15B are operation schematics of a control system of the tenth embodiment of the invention.
Figure 15B:
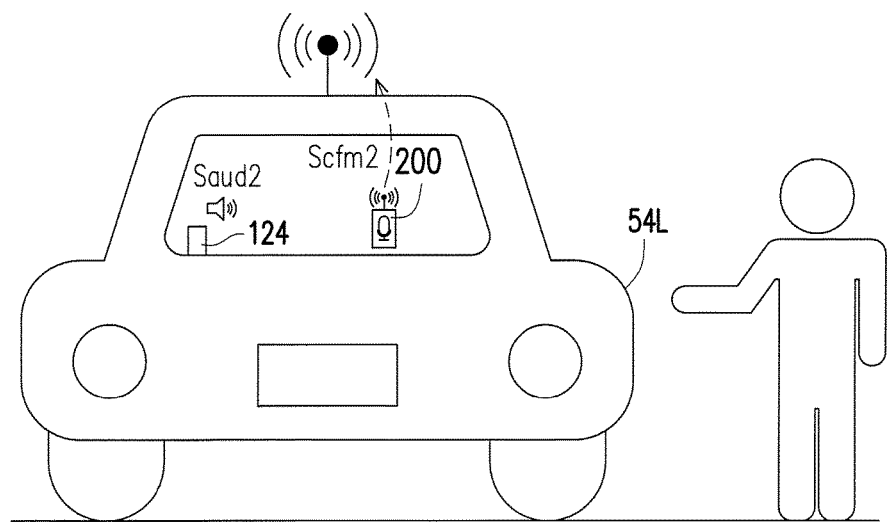

FIG. 15A and FIG. 15B are operation schematics of a control system of the tenth embodiment of the invention. The application of detecting whether the mobile device 200 is left in the car to decide whether the car doors are locked is implemented.

Referring to FIG. 15A and FIG. 15B, in the present embodiment, the car 50 is preset to the state in which the locking components 59 are in unlocked state and the engine is not started. The control unit 130 detects whether the driver side car door 54L is open, and enables the audio transmitting unit 124 in the car after the driver side car door 54L is opened and then closed, such that the audio transmitting unit 124 transmits the audio signal Saud2.

At this point, if the driver does not leave the mobile device 200 in the car as shown in FIG. 15A, then the control unit 130 determines the mobile device 200 is not located in the car when the confirmation signal Scfm2 is not received after the preset period. Therefore, the control unit 130 enables the bluetooth module 112 on the car door handles 55 when the car door trigger signal is received (i.e., when the driver triggers the car door trigger buttons 53) such that the bluetooth module 122 transmits the bluetooth signal Sble. When the RSSI value of the bluetooth signal Sble received by the mobile device 200 is determined to be located in the preset strength range, the control unit 130 receives the confirmation signal Scfm1 and determines the driver triggers the car door trigger buttons 53. The locking components 59 are switched to locked state to lock the car 50.

On the other hand, if the driver leaves the mobile device 200 in the car as shown in FIG. 15B, then the control unit 130 receives the confirmation signal Scfm2 returned by the mobile device 200 in response to the audio signal Saud2 and determines the mobile device 200 is located in the car. Therefore, the control unit 130 controls the car 50 to send an alarm prompt and controls the locking components 59 to remain in unlocked state when the control unit 130 receives the car door trigger signal (i.e., when the driver triggers the car door trigger buttons 53), so as to prevent the car 50 from locking when the driver forgets the mobile device 200 in the car.

Figure 16:
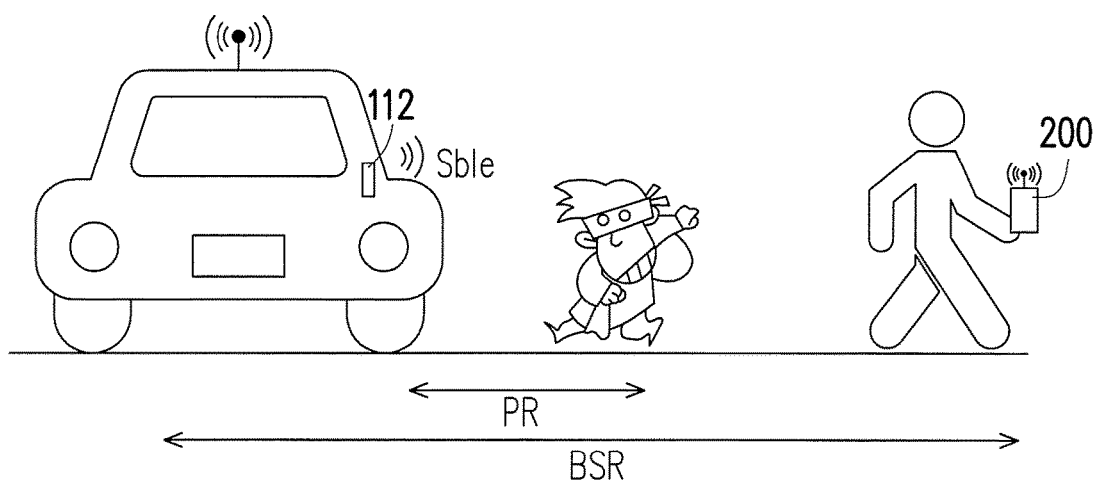
FIG. 16 is an operation schematic of a control system of the eleventh embodiment of the invention.

FIG. 16 is an operation schematic of a control system of the eleventh embodiment of the invention. The application of anti-theft detection is implemented. Referring to FIG. 16, in the present embodiment, the car 50 is preset to the state in which the locking components 59 are in locked state. In the case that the lawful user has locked the car 50 and left, if an unlawful user is trying to open the car doors and trigger the car door trigger buttons 53, then the control unit 130 enables the bluetooth module 112 outside the car when the car door trigger signal is received, such that the bluetooth module 112 transmits the bluetooth signal Sble and enables the audio transceiver module 124 in the car to transmit the audio signal Saud2 satisfying a preset signal requirement.

At this point, the lawful user should be located outside the preset range PR and located in the outside space OS, such that the mobile device 200 cannot receive the bluetooth signal Sble, or the RSSI value of the bluetooth signal Sble received is located outside the preset strength range. Therefore, the control unit 130 determines the user currently triggering the car door trigger buttons 53 is an unlawful user after the preset period, and accordingly controls the car 50 to send an anti-theft alarm or controls the mobile device 200 to send an anti-theft alarm.

Other applications such as implementing engine start function are as shown in FIG. 6A and FIG. 6B, i.e., the third embodiment of the invention. The application of detecting whether the mobile device 200 is unexpectedly taken from the car is as shown in FIG. 7, i.e., the fourth embodiment of the invention. The application of detecting whether the mobile device 200 is left in the car trunk to decide whether or not to close the car trunk lid is as shown in FIG. 10A and FIG. 10B, i.e., the seventh embodiment of the invention. The pairing action of sending the passkey is achieved in an out of band (OOB) manner using the audio signal Saud, and is not repeated herein.

Although the invention has been disclosed above by the embodiments, modifications and alterations can be made without departing from the spirit and scope of the invention. Therefore, the scope of the invention falls in the appended claims.

What is claimed is:

1. A control system, comprising:
a control device adapted to be disposed on a vehicle; and
a mobile device configured to establish a connection with the control device via a bluetooth transmission interface,
wherein when the connection is established, the control device and the mobile device perform an audio verification means such that the control device performs a verification on the mobile device via a transmission of an audio signal and accordingly detects a relative position between the mobile device and the vehicle,
wherein when the mobile device is verified, the control device performs a control function on the vehicle according to an operating state of the vehicle and the relative position between the vehicle and the mobile device,
wherein the control device comprises:
a first bluetooth transceiver module configured to provide the bluetooth transmission interface;
an audio transceiver module configured to transmit or receive the audio signal; and
a control unit electrically connected to the first bluetooth transceiver module and the audio transceiver module to perform the verification on the mobile device and accordingly perform the control function on the vehicle according to the operating state of the vehicle and the relative position between the vehicle and the mobile device,
wherein when the control device and the mobile device perform the audio verification means, the control unit enables the audio transceiver module to transmit the audio signal, and the mobile device determines whether an audio strength of the received audio signal is greater than a preset audio strength threshold and determines whether a signal waveform of the audio signal satisfies a preset signal requirement,
wherein when the mobile device determines the audio strength of the audio signal is greater than the preset audio strength threshold and the signal waveform of the audio signal satisfies the preset signal requirement, the mobile device returns a confirmation signal via the bluetooth transmission interface, and when the first bluetooth transceiver module receives the confirmation signal, the control unit determines the relative position between the vehicle and the mobile device according to a position of the audio transceiver module, and accordingly performs the control function.

2. The control system of claim 1, wherein the vehicle comprises a car body and a plurality of car doors, the car doors are disposed on the car body, and the car body and the car doors define an inside space and an outside space of the vehicle, wherein the audio transceiver module comprises:
a first audio transmitting unit disposed outside the car and controlled by the control unit to transmit a first audio signal toward the outside space,
wherein when an audio strength of the first audio signal received by the mobile device is greater than a preset audio strength threshold and a signal waveform of the audio signal satisfies a preset signal requirement, the mobile device returns a first confirmation signal via the bluetooth transmission interface,
when the first bluetooth transceiver module receives the first confirmation signal within a preset period, the control unit determines the mobile device is located in the outside space and within a preset distance from the car body, and
when the first bluetooth transceiver module does not receive the first confirmation signal within the preset period, the control unit determines the mobile device is located in the inside space or determines the mobile device is located in the outside space and is farther than the preset distance away from the car body.

3. The control system of claim 2, wherein the audio transceiver module further comprises:
a second audio transmitting unit disposed in the inside space and controlled by the control unit to transmit a second audio signal toward the inside space,
wherein when an audio strength of the second audio signal received by the mobile device is greater than another preset audio strength threshold and a signal waveform of the audio signal satisfies the preset signal requirement, the mobile device returns a second confirmation signal via the bluetooth transmission interface,
when the first bluetooth transceiver module receives the second confirmation signal within the preset period, the control unit determines the mobile device is located in the inside space, and
when the first bluetooth transceiver module does not receive the second confirmation signal within the preset period, the control unit determines the mobile device is not located in the inside space.

4. The control system of claim 3, wherein in a state in which the connection is not established, the control unit enables the second audio transmitting unit and the first bluetooth transceiver module when the control unit determines the car doors are closed, so as to make the second audio transmitting unit transmits a second audio signal containing a bluetooth passkey, the mobile device is paired with the first bluetooth transceiver module according to the bluetooth passkey in the second audio signal, and accordingly establishes the connection.

5. The control system of claim 4, wherein the inside space is divided into a sitting space and a trunk space, the second audio transmitting unit is disposed in the sitting space, and the audio transceiver module further comprises:
a third audio transmitting unit disposed in the trunk space and controlled by the control unit to transmit a third audio signal toward the trunk space,
wherein when an audio strength of the third audio signal received by the mobile device is greater than another preset audio strength threshold and a signal waveform of the audio signal satisfies the preset signal requirement, the mobile device returns a third confirmation signal via the bluetooth transmission interface,
when the first bluetooth transceiver module receives the third confirmation signal within the preset period, the control unit determines the mobile device is located in the trunk space, and
when the first bluetooth transceiver module does not receive the third confirmation signal within the preset period, the control unit determines the mobile device is not located in the trunk space.

6. The control system of claim 1, wherein when the connection is established, the control device and the mobile device perform a bluetooth verification means and the audio verification means, such that the control device performs the verification on the mobile device via a transmission of a bluetooth signal and a transmission of the audio signal, and accordingly detects the relative position between the mobile device and the vehicle,
wherein the control device further comprises:
a second bluetooth transceiver module configured to transmit or receive the bluetooth signal, and the control unit electrically connected to the second bluetooth transceiver module,
wherein when the control device and the mobile device perform the bluetooth verification means, the control unit enables the second bluetooth transceiver module to transmit the bluetooth signal, and the mobile device determines whether a received signal strength indicator (RSSI) of the received bluetooth signal is located in a preset strength range;
when the mobile device determines the RSSI of the bluetooth signal is located within the preset strength range and an audio strength of receiving the audio signal is not greater than the preset audio strength threshold, the mobile device returns a confirmation signal via the bluetooth transmission interface; and
when the first bluetooth transceiver module receives the confirmation signal, the control unit determines the relative position between the vehicle and the mobile device according to positions of the second bluetooth transceiver module and the audio transceiver module and accordingly performs the control function.

7. The control system of claim 6, wherein the vehicle comprises a car body and a plurality of car doors, the car doors are disposed on the car body, and the car body and the car doors define an inside space and an outside space of the vehicle,
wherein the audio transceiver module is disposed in the inside space to transmit the audio signal toward the inside space,
wherein when the first bluetooth transceiver module receives the confirmation signal within a preset period, the control unit determines the mobile device is located in the outside space and within a preset distance from the car body,
wherein when the first bluetooth transceiver module does not receive the confirmation signal within the preset period, the control unit determines the mobile device is located in the inside space or located in the outside space and is farther than the preset distance away from the car body.

8. A control device adapted to be disposed on a vehicle, the control device comprising:
a first bluetooth transceiver module configured to provide a bluetooth transmission interface;
an audio transceiver module controlled to transmit or receive an audio signal; and
a control unit electrically connected to the first bluetooth transceiver module and the audio transceiver module to control operations of the first bluetooth transceiver module and the audio transceiver module,
wherein when the first bluetooth transceiver module establishes a connection, the control unit performs an audio verification means, so as to perform a verification on a mobile device for which a connection is established with the first bluetooth transceiver module via a transmission of the audio signal, and accordingly detects a relative position between the mobile device and the vehicle,
wherein when the mobile device is verified, the control unit performs a control function on the vehicle according to an operating state of the vehicle and the relative position between the vehicle and the mobile device,
wherein when the control unit performs the audio verification means, the control unit enables the audio transceiver module to transmit or receive the audio signal,
wherein when the audio transceiver module is enable to transmit the audio signal having a preset signal requirement and the mobile device determines the audio strength of the audio signal is greater than the preset audio strength threshold and a signal waveform of the audio signal satisfies the preset signal requirement, the first bluetooth transceiver module receives a confirmation signal via the bluetooth transmission interface from the mobile device, and when the first bluetooth transceiver module receives the confirmation signal, the control unit determines the mobile device is verified and determines the relative position between the vehicle and the mobile device according to a position of the audio transceiver module, and accordingly performs the control function.

9. The control device of claim 8, wherein when the control unit performs the audio verification means and the control unit is enabled to receive the audio signal, the control unit determines whether an audio strength of the received audio signal is greater than a preset audio strength threshold and determines whether the signal waveform of the audio signal satisfies a preset signal requirement, and when the control unit determines the audio strength of the received audio signal is greater than the preset audio signal threshold and the signal waveform of the audio signal satisfies the preset signal requirement, the control unit determines the mobile device is verified and determines the relative position between the vehicle and the mobile device according to the position of the audio transceiver module, and accordingly performs the control function.

10. The control device of claim 8, wherein the vehicle comprises a car body and a plurality of car doors, the car doors are disposed on the car body, the car body and the car doors define an inside space and an outside space of the vehicle, and the audio transceiver module comprises:
  a first audio transmitting unit disposed outside the car and controlled by the control unit to transmit a first audio signal toward the outside space; and
  a second audio transmitting unit disposed in the inside space and controlled by the control unit to transmit a second audio signal toward the inside space.

11. The control device of claim 8, wherein the control device further comprises:
  a second bluetooth transceiver module configured to transmit or receive a bluetooth signal, wherein the control unit is electrically connected to the second bluetooth transceiver module to control an operation of the second bluetooth transceiver module,
  wherein when the first bluetooth transceiver module establishes the connection, the control unit performs a bluetooth verification means and the audio verification means, so as to perform the verification on the mobile device establishing the connection with the first bluetooth transceiver module by using a transmission of the bluetooth signal and the transmission of the audio signal via the second bluetooth transceiver module and the audio transceiver module, and accordingly detects a relative position between the mobile device and the vehicle.

12. The control device of claim 11, wherein when the control device performs the bluetooth verification means and the audio verification means, the control unit enables the second bluetooth transceiver module to transmit the bluetooth signal and enables the audio transceiver module to transmit the audio signal satisfying the preset signal requirement, and when the first bluetooth transceiver module receives the confirmation signal, the control unit determines the mobile device is verified,
  wherein the vehicle comprises a car body and a plurality of car doors, the car doors are disposed on the car body, and the car body and the car doors define an inside space and an outside space of the vehicle,
  wherein the audio transceiver module is disposed in the inside space to transmit the audio signal toward the inside space,
  wherein when the first bluetooth transceiver module receives the confirmation signal within a preset period, the control unit determines the mobile device is located in the outside space and within a preset distance from the car body,
  wherein when the first bluetooth transceiver module does not receive the confirmation signal within the preset period, the control unit determines the mobile device is located in the inside space or located in the outside space and is farther than the preset distance from the car body.

13. The control device of claim 11, wherein when the control device performs the bluetooth verification means and the audio verification means, the control unit enables the second bluetooth transceiver module to receive the bluetooth signal and determines whether a received signal strength indicator of the received bluetooth signal is located in a preset strength range and enables the audio transceiver module to receive the audio signal, and determines whether a signal strength of the received audio signal is greater than a preset signal strength threshold, and determines whether a signal waveform of the audio signal satisfies the preset signal requirement, and when the control unit determines the received signal strength indicator of the received bluetooth signal is located in the preset strength range and the audio strength of the received audio signal is not greater than the preset audio strength threshold, the control unit determines the mobile device is verified.

14. A mobile device adapted to perform passive keyless remote control on a vehicle, the mobile device comprising:
  a bluetooth transceiver module configured to provide a bluetooth transmission interface;
  an audio transceiver module controlled to transmit or receive an audio signal; and
  a processing unit electrically connected to the bluetooth transceiver module and the audio transceiver module to control operations of the bluetooth transceiver module and the audio transceiver module,
  wherein when the bluetooth transceiver module establishes a connection, the processing unit performs an audio verification means, so as to provide a verification information to a vehicle for which a connection is established with the bluetooth transceiver module via a transmission of the audio signal,
  wherein when the mobile device performs the audio verification means, the processing unit enables the audio transceiver module to receive the audio signal, and the processing unit determines whether an audio strength of the received audio signal is greater than a preset audio strength threshold and determines whether a signal waveform of the audio signal satisfies a preset signal requirement,
  wherein when the processing unit determines the audio strength of the audio signal is greater than the preset audio strength threshold and the signal waveform of the audio signal satisfies the preset signal requirement, the processing unit returns a confirmation signal via the bluetooth transmission interface, and
  wherein when a bluetooth transceiver module of the vehicle receives the confirmation signal, a control unit of the vehicle determines the relative position between the vehicle and the mobile device according to a position of the audio transceiver module, and accordingly performs a control function on the vehicle.

15. The control device of claim 14, wherein the bluetooth transceiver module transmits or receives a bluetooth signal,
  wherein when the bluetooth transceiver module establishes the connection, the processing unit performs the audio verification means and a bluetooth verification means to provide the verification information to the vehicle for which a connection is established with the bluetooth transceiver module via a transmission of the audio signal and a transmission of the bluetooth signal, module to receive the bluetooth signal and determines whether a received signal strength indicator of the received bluetooth signal is located in a preset strength range and enables the audio transceiver module to receive the audio signal, and determines whether the signal strength of the received audio signal is greater than the preset signal strength threshold, and determines whether the signal waveform of the audio signal satisfies the preset signal requirement, and when the processing unit determines the received signal strength indicator of the received bluetooth signal is located in the preset strength range and the audio strength of the received audio signal is not greater than the preset audio strength threshold, the processing unit returns the confirmation signal via the bluetooth transmission interface.

* * * * *

UNITED STATES PATENT AND TRADEMARK OFFICE
CERTIFICATE OF CORRECTION

PATENT NO.         : 10,034,146 B2
APPLICATION NO.    : 15/226927
DATED              : July 24, 2018
INVENTOR(S)        : Hsun-Hsin Chuang Page 1 of 1

It is certified that error appears in the above-identified patent and that said Letters Patent is hereby corrected as shown below:

Claim 15 should be corrected as follows:
15. The mobile device of claim 14, wherein the bluetooth transceiver module transmits or receives a bluetooth signal,
    wherein when the bluetooth transceiver module establishes the connection, the processing unit performs the audio verification means and a bluetooth verification means to provide the verification information to the vehicle for which a connection is established with the bluetooth transceiver module via a transmission of the audio signal and a transmission of the bluetooth signal,
    wherein when the processing unit performs the bluetooth verification means and the audio verification means, the processing unit enables the bluetooth transceiver module to receive the bluetooth signal and determines whether a received signal strength indicator of the received bluetooth signal is located in a preset strength range and enables the audio transceiver module to receive the audio signal, and determines whether the signal strength of the received audio signal is greater than the preset signal strength threshold, and determines whether the signal waveform of the audio signal satisfies the preset signal requirement, and when the processing unit determines the received signal strength indicator of the received bluetooth signal is located in the preset strength range and the audio strength of the received audio signal is not greater than the preset audio strength threshold, the processing unit returns the confirmation signal via the bluetooth transmission interface.

<div style="text-align: right;">
Signed and Sealed this<br>
Thirtieth Day of October, 2018
</div>

<div style="text-align: right;">
Andrei Iancu<br>
<em>Director of the United States Patent and Trademark Office</em>
</div>